US012351047B2

(12) United States Patent
Javidan et al.

(10) Patent No.: US 12,351,047 B2
(45) Date of Patent: Jul. 8, 2025

(54) SYSTEM FOR POWER SUPPLY, POWER GENERATION, AND POWER DISTRIBUTION OF A TRAILER

(71) Applicant: Range Energy Inc., Mountain View, CA (US)

(72) Inventors: Ali Javidan, Sunnyvale, CA (US); Kyle Foley, Half Moon Bay, CA (US); Bryan Booth, San Mateo, CA (US); Ryan Flatland, Redwood City, CA (US); Collin MacGregor, Redwood City, CA (US); David Sands, San Mateo, CA (US); Robert Alan Ng, Los Altos, CA (US); Adam Smith, Austin, TX (US)

(73) Assignee: Range Energy Inc., Mountain View, CA (US)

( * ) Notice: Subject to any disclaimer, the term of this patent is extended or adjusted under 35 U.S.C. 154(b) by 33 days.

(21) Appl. No.: 18/381,583

(22) Filed: Oct. 18, 2023

(65) Prior Publication Data

US 2024/0067005 A1   Feb. 29, 2024

Related U.S. Application Data

(63) Continuation-in-part of application No. 18/238,405, filed on Aug. 25, 2023, and a continuation-in-part of application No. 18/238,415, filed on Aug. 25, 2023, and a continuation-in-part of application No.
(Continued)

(51) Int. Cl.
*B60L 53/12* (2019.01)
*B60L 53/38* (2019.01)

(52) U.S. Cl.
CPC .............. *B60L 53/12* (2019.02); *B60L 53/38* (2019.02); *B60L 2200/28* (2013.01)

(58) Field of Classification Search
CPC ....... B60L 53/12; B60L 53/38; B60L 2200/28
See application file for complete search history.

(56) References Cited

U.S. PATENT DOCUMENTS 11,485,330 B1 * 11/2022 Kulkarni .................. B60D 1/62
2020/0233410 A1 * 7/2020 Burns ....................... B60L 50/66
(Continued)

*Primary Examiner* — Jared Fureman
*Assistant Examiner* — Duc M Pham
(74) *Attorney, Agent, or Firm* — Run8 Patent Group, LLC; Peter Miller

(57) ABSTRACT

One variation of a system for power distribution of a trailer includes: a trailer chassis; a driven axle suspended from the trailer chassis; and a motor coupled to the driven axle. The system further includes a battery assembly coupled to the trailer chassis and configured to supply electrical energy to the motor to drive the driven axle and source electrical energy from the motor to slow motion of the driven axle. The system also includes a charging panel coupled to the trailer chassis and configured to couple to an external charging element. The system further includes a panel actuator configured to advance the charging panel from the trailer chassis to an open position to form a target gap between the external charging element and the charging panel and to retract the charging panel to a closed position to decouple the charging panel from the external charging element.

20 Claims, 6 Drawing Sheets

Related U.S. Application Data

18/238,408, filed on Aug. 25, 2023, now Pat. No. 11,965,795.

(60) Provisional application No. 63/431,273, filed on Dec. 8, 2022, provisional application No. 63/420,469, filed on Oct. 28, 2022, provisional application No. 63/417,212, filed on Oct. 18, 2022, provisional application No. 63/401,030, filed on Aug. 25, 2022.

(56) References Cited

U.S. PATENT DOCUMENTS

| | | | |
|---|---|---|---|
| 2023/0219440 A1* | 7/2023 | Salter | B60W 20/20 |
| | | | 320/109 |
| 2024/0034190 A1* | 2/2024 | Layfield | B60W 30/02 |
| 2024/0042861 A1* | 2/2024 | Mergener | H02J 7/0042 |

* cited by examiner

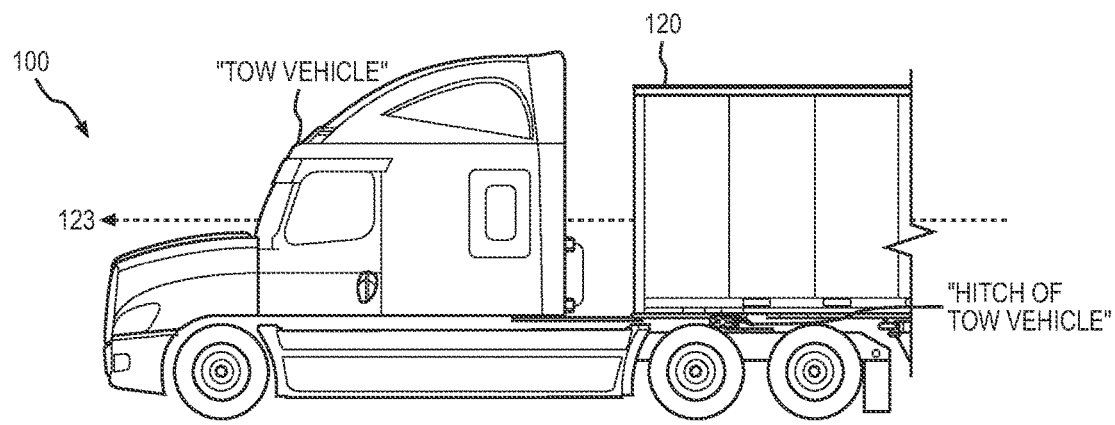
*FIG.5A*
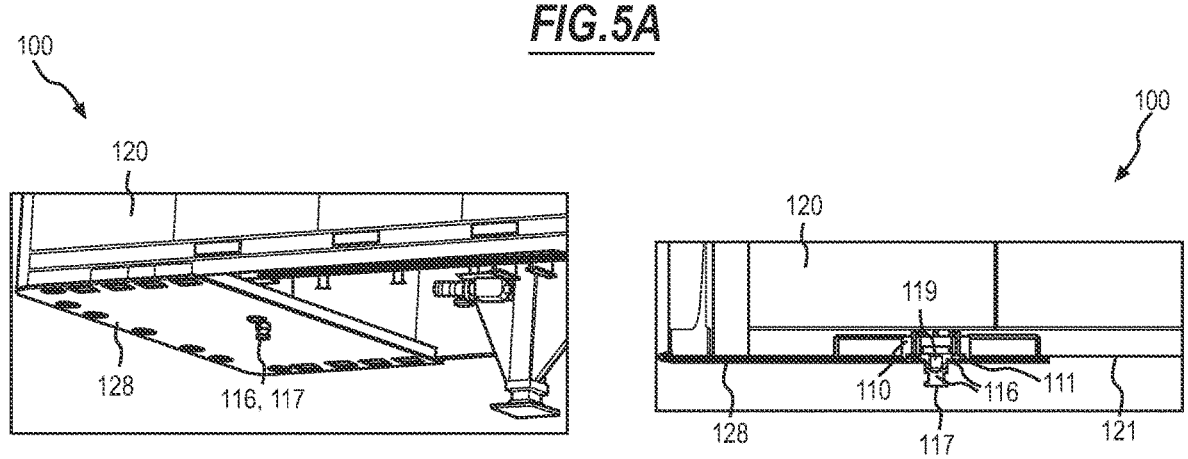
*FIG.5B*
*FIG.5C*
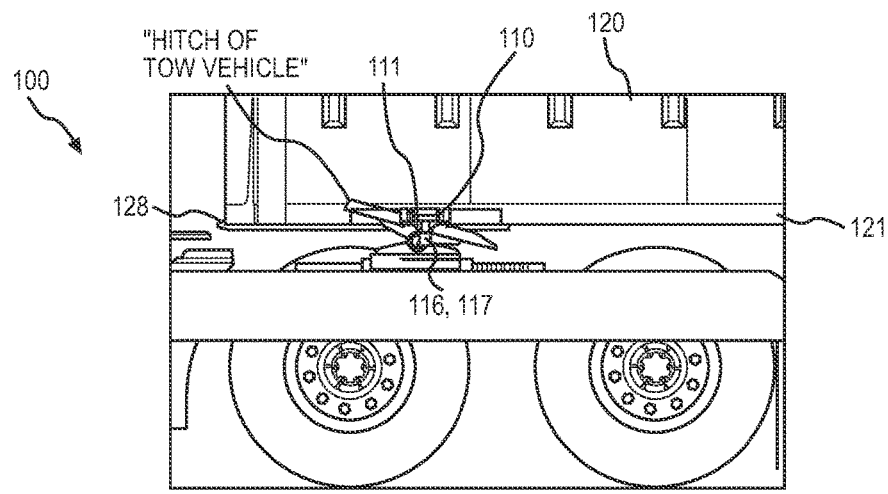
*FIG.5D*

SYSTEM FOR POWER SUPPLY, POWER GENERATION, AND POWER DISTRIBUTION OF A TRAILER

CROSS-REFERENCE TO RELATED APPLICATIONS

This Application claims the benefit of U.S. Provisional Application No. 63/417,212, filed on 18 Oct. 2022.

This Application is a continuation-in-part application of U.S. patent application Ser. No. 18/238,405, filed on 25 Aug. 2023, Ser. No. 18/238,408, filed on 25 Aug. 2023, and Ser. No. 18/238,415, filed on 25 Aug. 2023, which claim the benefit of U.S. Provisional Application No. 63/401,030, filed on 25 Aug. 2022, 63/420,469, filed on 28 Oct. 2022, and 63/431,273, filed on 8 Dec. 2022, each of which is incorporated in its entirety by this reference.

TECHNICAL FIELD

This invention relates generally to the field of overland trucking and more specifically to a new and useful system for power supply, power generation, and power distribution of a trailer in the field of overland trucking.

BRIEF DESCRIPTION OF THE FIGURES

FIGS. 5A, 5B, 5C, and 5D are schematic representations of one variation of the system.

DESCRIPTION OF THE EMBODIMENTS

Figure 1A:
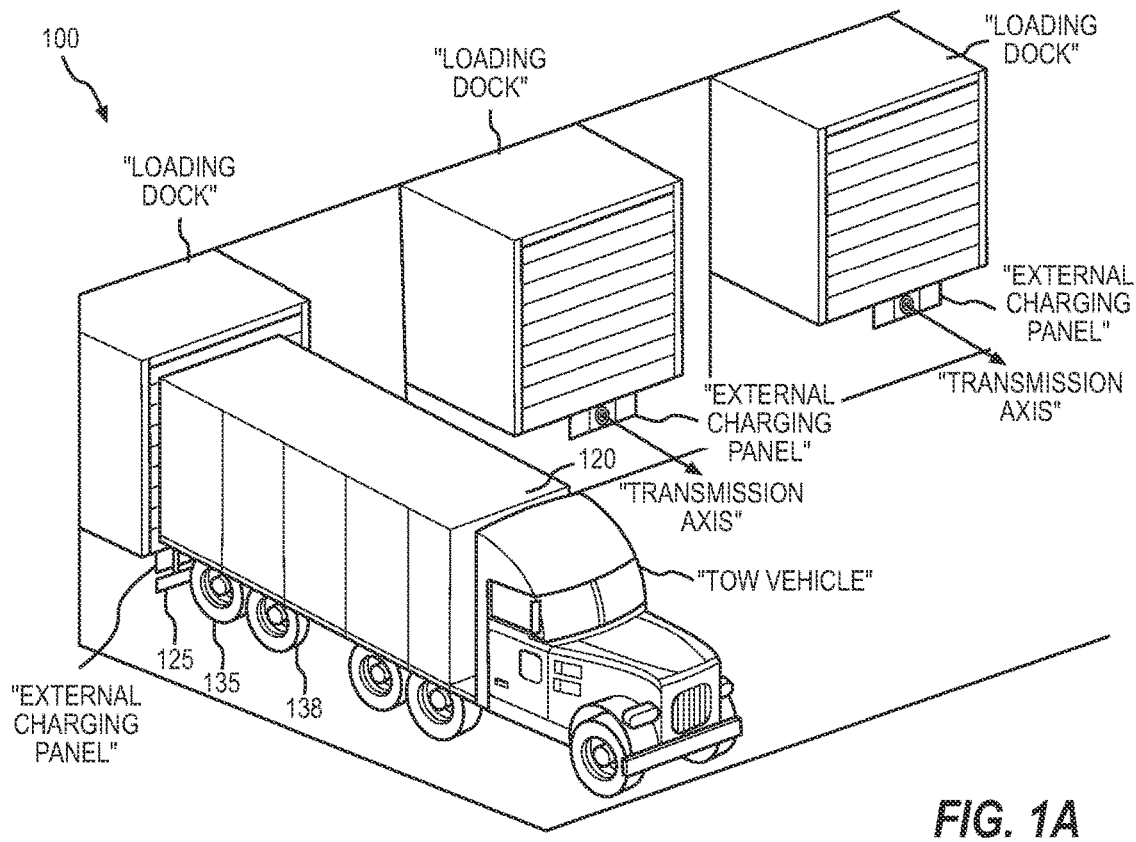
FIGS. 1A and 1B are schematic representations of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1A, 1B, 3A, and 3B, a system 100 for power distribution of a trailer 120 includes: a trailer chassis 121; a driven axle 137; a motor 131; a battery assembly 140; a charging panel 150; a panel actuator 156; and a controller 160. The trailer chassis 121 includes a vehicle coupler 110 arranged on a first end 128 of the trailer chassis 121 and configured to couple to a tow vehicle. The driven axle 137 is suspended from the trailer chassis 121 and the motor 131 is coupled to the driven axle 137. The battery assembly 140 is: coupled to the trailer chassis 121; is arranged on a second end 129 of the trailer chassis 121 opposite the first end 128; configured to supply electrical energy to the motor 131 to drive the driven axle 137; and configured to source electrical energy from the motor 131 to slow motion of the driven axle 137. The charging panel 150 is coupled to the trailer chassis 121, arranged on the second end 129 of the trailer 120 adjacent the battery assembly 140, and configured to inductively couple to an external charging element. The panel actuator 156 is configured to: drive the charging panel 150 downwardly from the trailer chassis 121 to convert energy from the external charging element into electrical energy; and retract the charging panel 150 upwardly to decouple the charging panel 150 from the external charging element.

The controller 160 is configured to, at a first time: detect the trailer chassis 121 coupled to the tow vehicle via the vehicle coupler no; detect a first charge state of a battery pack of the tow vehicle; detect a second charge state of the battery assembly 140 of the trailer 120; and, in response to the second charge state of the battery assembly 140 of the trailer 120 exceeding the first charge state of the battery pack of the tow vehicle, direct a first proportion of electrical energy, converted by the charging panel 150, to the battery pack of the tow vehicle and direct a second proportion of electrical energy, less than the first proportion, to the battery assembly 140 of the trailer 120.

In one variation, the system 100 includes: a trailer chassis 121; a driven axle 137; a motor 131; a battery assembly 140; a charging panel 150; a panel actuator 156; and a controller 160. The trailer chassis 121 includes a vehicle coupler 110 arranged on a first end 128 of the trailer chassis 121 and configured to couple to a tow vehicle. The driven axle 137 is suspended from the trailer chassis 121 and the motor 131 is coupled to the driven axle 137. The battery assembly 140: includes a set of latches configured to transiently engage a subset of engagement features, in the first array of engagement features and in the second array of engagement features, to retain the battery assembly 140 below the trailer chassis 121; is configured to supply electrical energy to the motor 131 to drive the driven axle 137; and is configured to source electrical energy from the motor 131 to slow motion of the driven axle 137.

In this variation, the charging panel 150: is coupled to the trailer chassis 121; is arranged on a second end 129 of the trailer chassis 121 opposite the first end 128; is operable in a charge configuration, the charging panel 150 facing and inductively coupled to an external charging element to store energy from the external charging element and convert energy into electrical energy in the charge configuration; and is operable in a tow configuration, the charging panel 150 decoupled from the external charging element in the tow configuration. The panel actuator 156 is configured to actuate the charging panel 150. The controller 160 is configured to trigger the panel actuator 156 to maneuver the charging panel 150 between the charge configuration and the tow configuration and distribute electrical energy to a battery pack of the tow vehicle and the battery assembly 140 of the trailer 120 according to a charge order.

Figure 2A:
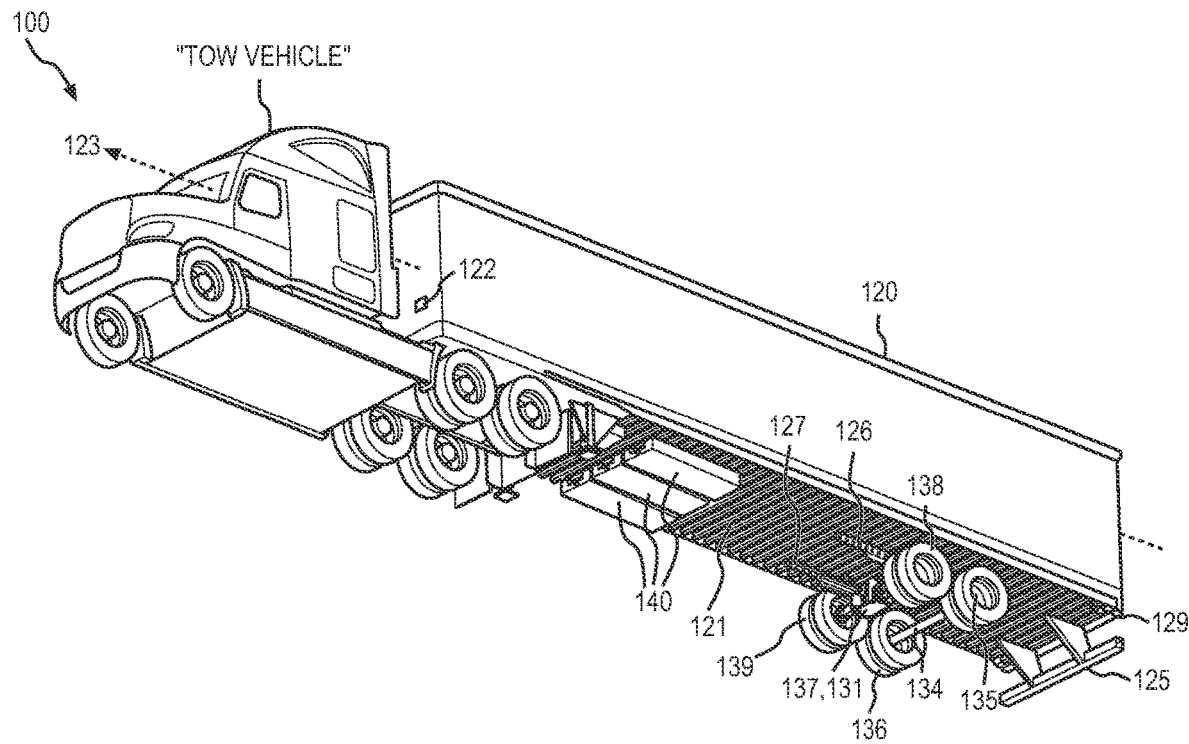
FIGS. 2A, 2B, and 2C are schematic representations of one variation of the system.
Figure 2B:
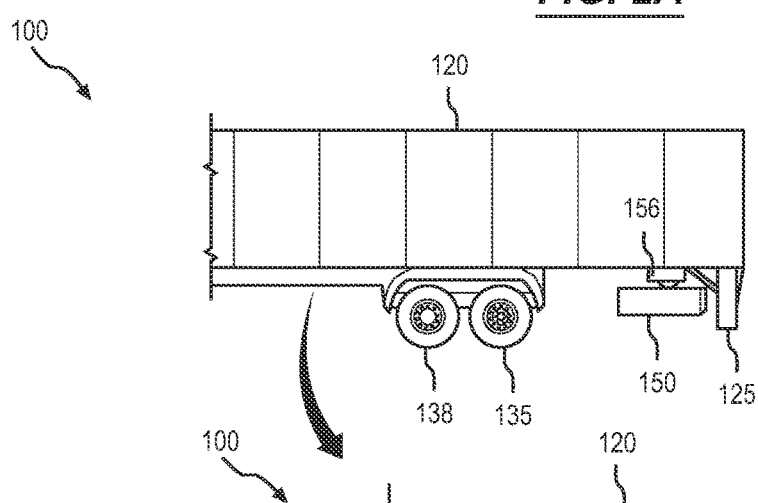
Figure 2C:
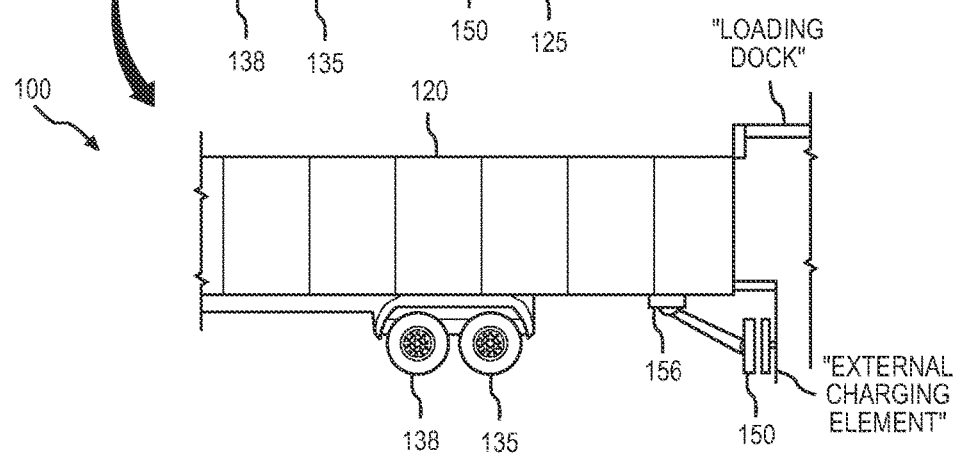
Figure 3A:
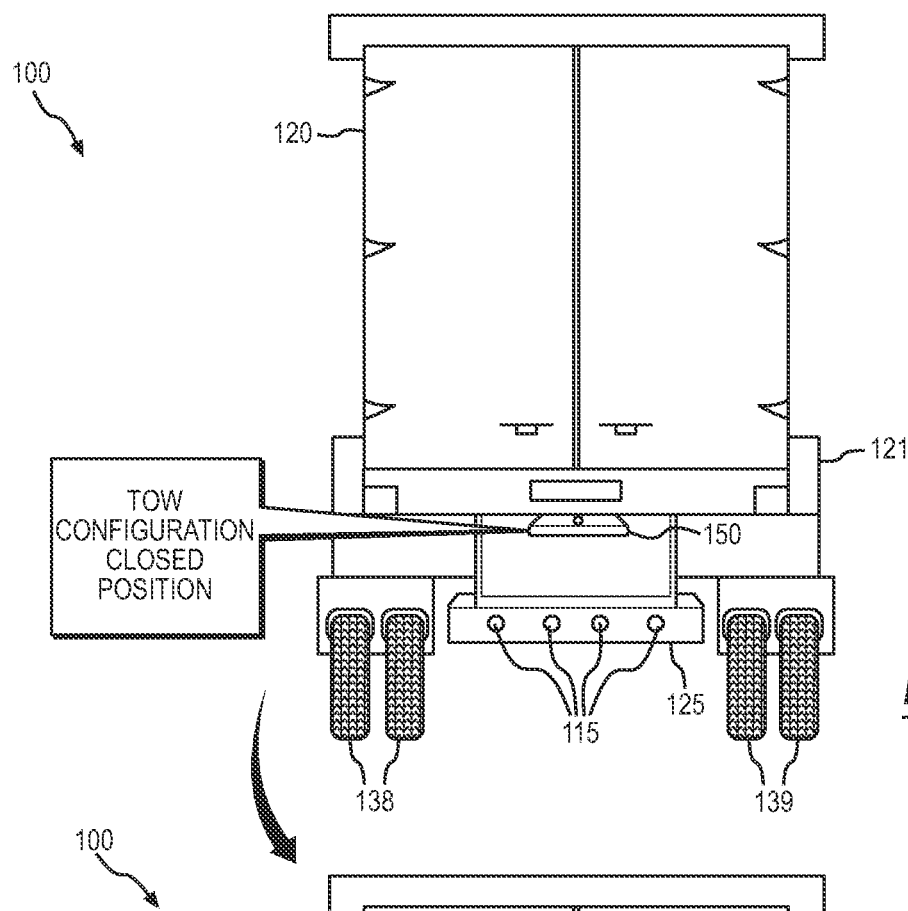
FIGS. 3A and 3B are schematic representations of one variation of the system.
Figure 3B:
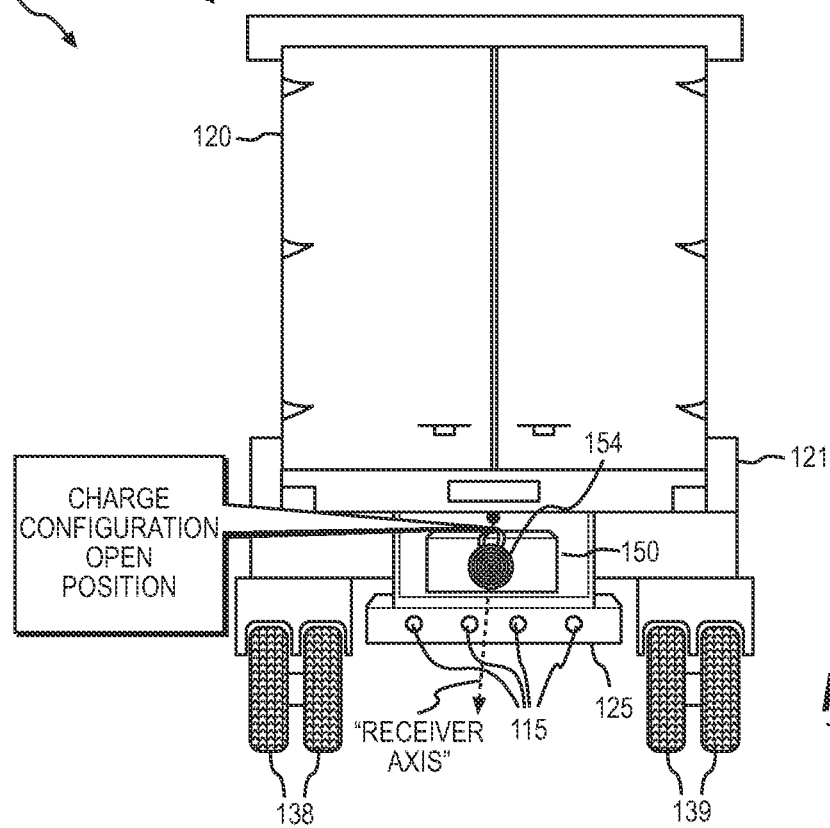

In another variation, shown in FIGS. 2A, 2B, and 2C, the system 100 includes: a trailer chassis 121; a driven axle 137; a motor 131; a battery assembly 140; a charging panel 150; and a panel actuator 156. The trailer chassis 121 includes a vehicle coupler 110 arranged on a first end 128 of the trailer chassis 121 and configured to couple to a tow vehicle. The driven axle 137 is suspended from the trailer chassis 121 and the motor 131 is coupled to the driven axle 137. The battery assembly 140 is coupled to the trailer chassis 121, arranged on a second end 129 of the trailer chassis 121 opposite the first end 128, configured to supply electrical energy to the motor 131 to drive the driven axle 137, and configured to source electrical energy from the motor 131 to slow motion of the driven axle 137. The charging panel 150: is coupled to the trailer chassis 121; is arranged on a second end 129 of the trailer chassis 121 opposite the first end 128; and is configured to inductively couple to an external charging element. The panel actuator 156 is configured to downwardly pivot the charging panel 150 from the trailer chassis 121 to an open position to form a target gap between the external charging element and the charging panel 150 and to upwardly pivot the charging panel 150 to a closed position to decouple the charging panel 150 from the external charging element.

2. Applications

Generally, the system 100 defines an electric trailer 120 that includes: a trailer chassis 121; a set of rails 126,127; a vehicle coupler such as a kingpin 110; a trailer coupler; a driven axle 137; a motor 131; a set of sensors 115; a battery assembly 140; a charging panel 150; a panel actuator 156; and a controller 160.

More specifically, the set of sensors 115 can include force sensors (e.g., a strain gauge, an inertial measurement unit, a load cell), optical sensors (e.g., a one-dimensional depth sensor, a LIDAR sensor, an RGB camera), inertial sensors (e.g., an inertial measurement unit, an accelerometer, a gyroscope); and/or proximity sensors (e.g., an electromagnetic field sensor, a Hall effect sensor, a conductive sensor, an inductive sensor) coupled to the trailer chassis 121, the kingpin 110, or a rear impact guard 125. The set of sensors 115 can transmit signals to the controller 160 to detect a condition of the trailer 120. The system 100 further includes: a battery assembly 140 configured to transiently install on the trailer 120 over a range of longitudinal positions and integrated directly with the trailer chassis 121 in order to receive electrical energy and to supply electrical energy to the motor 131; and a charging panel 150 coupled to the trailer chassis 121 and arranged on the second end 129 of the trailer chassis 121 adjacent the battery assembly 140. The charging panel 150 is configured to inductively and/or conductively couple to an external charging element of a loading dock to receive energy from the external charging element, convert this energy into electrical energy, and route electrical energy to the controller 160. The system 100 also includes an electromechanical, pneumatic, or hydraulic panel actuator 156 coupled to and arranged on the second end of the trailer chassis 121 and configured to actuate the charging panel 150.

Additionally, the system 100 is operable in a set of modes, including a charge mode and a tow mode. In particular, the controller 160 can: access a signal from the array of proximity sensors 115; detect presence of the external charging element within the threshold distance of the rear impact guard 125; and, in response to detecting presence of the external charging element within the threshold distance of the rear impact guard 125, enter the charge mode and trigger the panel actuator 156 to downwardly pivot the charging panel 150 from the trailer chassis 121 to an open position to inductively couple to the external charging element. In the charge mode, the controller 160 can: detect a charge state of the battery assembly 140 of the trailer 120 and/or an energy storage system of an additional electric tow vehicle or secondary trailer, or any other battery powered device coupled to the trailer 120; and selectively direct proportions of electrical energy, converted by the charging panel 150, to the battery assembly 140 of the trailer 120, to a battery pack of a tow vehicle coupled to the trailer 120, to a battery module or electrical system of the secondary trailer, and to any other battery powered device based on these charge states.

At the end of charge mode, the controller 160 can interface with the integrated controller of the kingpin 110 to detect forces applied to the kingpin 110 by the hitch of the tow vehicle, trigger the panel actuator 156 to upwardly pivot the charging panel 150 to the closed position, and enter a tow mode. In tow mode, the controller 160 can: detect conditions of the trailer 120 such as including: a direction of motion of the trailer 120; a tractor-trailer angle (e.g., a steering angle); a speed of the trailer 120; an incline angle of the trailer 120 (e.g., a grade of a ground surface); a location of the trailer 120; forces applied to the kingpin no (e.g., lateral forces, longitudinal forces, total forces); and a charge state of the battery assembly 140 of the trailer 120. The controller 160 can then: calculate a target preload force proportional to and/or inversely proportional to the condition of the trailer 120; and trigger the motor 131 to increase torque output and/or reduce torque output in the direction of motion of the trailer 120 to decrease a difference between the target preload force and a total force applied to the kingpin no to control the trailer 120 in conjunction with the tow vehicle.

2.1 Charge Mode

Once the charging panel 150 occupies the open position in the charge configuration, the controller 160 can: detect a charge state of the battery assembly 140 of the trailer 120 and/or additional tow vehicles (e.g., electric tractors, hybrid tractors, hydrogen fuel cell tractors) or secondary trailers (e.g., dry van trailers, refrigerated trailers) coupled to the trailer 120; selectively direct proportions of electrical energy to the battery assembly 140 of the trailer 120, to a battery module of a tow vehicle coupled to the trailer 120, and/or to secondary trailers coupled to the trailer 120 based on these charge states.

In one example, in the charge mode, the controller 160: detects a charge state of the battery assembly 140 of the trailer 120; and, in response to the charge state of the battery assembly falling below a threshold charge state, selectively directs a proportion of electrical energy to the battery assembly 140 and thus, prioritizes charging the battery assembly 140.

In another example, in the charge mode, the controller 160: detects a hitch of a tow vehicle coupled to the trailer 120 via the kingpin no; detects a charge state of the battery assembly 140 of the trailer 120; detects a charge state of an energy storage system—such as a battery pack, a battery module, or a battery assembly—of the tow vehicle; and accesses a charge order defining a set of charging rules or instructions. The controller 160 then identifies a charging rule or instruction corresponding to each charge state and directs a corresponding proportion of electrical energy, defined in the charge order, to the battery assembly 140 of the trailer 120 and to the energy storage system of the tow vehicle. Thus, the controller 160 prioritizes charging the energy storage system of the tow vehicle, which may be connected to the trailer 120 for a short time duration and manages the charge state of the battery assembly of the trailer 120.

In yet another example, in the charge mode, the controller 160: detects the trailer 120 coupled to the hitch of the tow vehicle via the kingpin no and coupled to a secondary trailer via the trailer coupler; detects a charge state of the battery assembly 140 of the trailer 120; and accesses a charge order defining a set of charging rules or instructions. The controller 160 then identifies a charging rule or instruction corresponding to each charge state and directs a corresponding proportion of electrical energy, defined in the charge order, from the charging panel 150 to the battery assembly 140 of the trailer 120 and to a secondary battery assembly of the secondary trailer and/or additional electrical systems coupled to the secondary trailer, such as a refrigeration system, in order to power the refrigeration system of the secondary trailer. Thus, the controller 160 prioritizes charging the energy storage system of the tow vehicle and manages the charge state of the battery assembly of the trailer 120 in preparation for a subsequent trip and to supply power to the refrigeration system of the secondary trailer.

2.2 Tow Mode

The controller 160 can then operate the charging panel 150 in a tow configuration by triggering the charging panel 150 to pivot upwardly from the open position to a closed position facing the trailer chassis 121 and enter a tow mode.

Once the charging panel 150 occupies the closed position in the tow configuration, the controller 160 can detect conditions of the trailer 120 such as: a direction of motion of the trailer 120 (e.g., a forward direction, a reverse direction); a tractor-trailer angle (e.g., a steering angle); a speed of the trailer 120; an incline angle of the trailer 120 (e.g., a grade of a ground surface); a location of the trailer 120; forces applied to the kingpin 110 (e.g., lateral forces, longitudinal forces, total forces); and a charge state of the battery assembly 140 (e.g., a status, a level, a percentage). The controller 160 can then: calculate a target preload force proportional to and/or inversely proportional to the condition of the trailer 120; and trigger the motor 131 to increase torque output and/or reduce torque output in the direction of motion of the trailer 120 to decrease a difference between the target preload force and a total force applied to the kingpin 110 to control the trailer 120 in conjunction with the tow vehicle.

2.3 Power Distribution

Therefore, the system 100 can autonomously transition between the charge mode and the tow mode responsive to local conditions detected by the system 100. Additionally, while the trailer 120 is docked and the charging panel 150 is conductively coupled to an external charging element of a loading dock, the system 100 can autonomously manage power distribution between the external charging element, the battery assembly 140 of the trailer 120, an energy storage system of a tow vehicle, a battery powered device, and/or a refrigeration system of a secondary refrigerated trailer coupled to the trailer 120.

Alternatively, while the trailer 120 is docked and the charging panel 150 is inductively coupled to an external charging element of a loading dock, the system 100 can autonomously manage power distribution between the external charging element, the battery assembly 140 of the trailer 120, an energy storage system of a tow vehicle, a battery powered device, and/or a refrigeration system of a secondary refrigerated trailer coupled to the trailer 120 without necessitating insertion or a mechanical connection of a power cable to a power port on the tow vehicle or the trailer 120.

3. Trailer

Generally, the trailer 120 includes: a trailer chassis 121; a set of rails 126,127; a vehicle coupler such as a kingpin 110; a trailer coupler; a driven axle 137; a motor 131; and a set of sensors. The left rail 126 and the right rail 127 are coupled to the trailer chassis 121 and run along a longitudinal axis 123 of the trailer 120, extending parallel to and laterally offset from a longitudinal centerline, to form a channel below the trailer chassis 121 of the trailer 120.

In one implementation, the trailer 120 includes: a trailer chassis 121; a left rail 126 coupled to the trailer chassis 121, extending parallel to and laterally offset from a longitudinal centerline of the trailer 120, and defining a first array of engagement features distributed along the left rail and longitudinally offset by a pitch distance; and a right rail 127 coupled to the trailer chassis 121, extending parallel to and laterally offset from the longitudinal centerline of the trailer 120 opposite the left rail, and defining a second array of engagement features distributed along the right rail and longitudinally offset by the pitch distance. In this implementation, the set of rails 126, 127 extends along a length of the trailer 120 and defines a channel below trailer chassis 121. Alternatively, the set of rails 126, 127 extends along a portion of the length of the trailer 120 and defines a channel below the trailer chassis 121 of the trailer 120.

Furthermore, the set of engagement features 124 can include a bore, a slot, an aperture, or an indentation distributed along each rail 126, 127 and configured to engage and retain a corresponding latch of a bogie 130 and/or a battery assembly 140, as further described below. However, each rail 126, 127 can include any other type of engagement feature configured to engage and retain a set of latches 133 of a bogie 130 and/or a battery assembly 140.

3.1 Trailer Chassis+Vehicle Coupler

In one variation, the trailer chassis 121 can include a vehicle coupler 110 to couple the trailer 120 to a tow vehicle—such as a tractor unit, a hybrid tractor, an electric tractor, a hydrogen fuel cell tractor, and/or an internal combustion engine tractor—in order to form a tractor-trailer 120 (e.g., a semi-truck, a semi, an 18-wheeler). For example, the trailer chassis 121 can include a kingpin 110 arranged on a proximal end 128 of the trailer chassis 121 and configured to interface with a fifth wheel of a tractor, as further described below.

Additionally, the vehicle coupler 110 is configured to couple to a secondary trailer—such as a dry van trailer or a refrigerated trailer—in order to form a longer combination vehicle (e.g., a tandem, a road-train, double trailers, triple trailers).

In one example, a dry van trailer includes a trailer chassis 121 and a vehicle coupler 110. The vehicle coupler 110 is arranged on the first end of the trailer chassis 121 and interfaces with a trailer coupler of a second dry van trailer to form a set of dry van trailers coupled in tandem with a tractor.

In another example, a dry van trailer includes a trailer chassis 121 and a vehicle coupler 110. The vehicle coupler 110 is arranged on the first end of the trailer chassis 121 and interfaces with a trailer coupler of a second refrigerated trailer to form a longer combination vehicle with a tractor.

The trailer chassis 121 supports the driven axle 137. The trailer chassis 121 can be manufactured from a metal such as stainless steel or aluminum alloy (e.g., 6061 or 7075). Additionally, the trailer chassis 121 can define a frame mounted to the floor of the trailer 120, such as by welding the trailer chassis 121 to the floor or bolting the trailer chassis 121 to the floor via a set of fasteners. However, the trailer chassis 121 can be manufactured in any other way and transiently installed on the trailer 120 in any other way.

3.1.1 Kingpin

The trailer 120 can further include a kingpin 110 arranged on a proximal end 128 of the trailer 120 opposite the bogie 130 and is configured to interface with a hitch (e.g., a fifth wheel) of a tow vehicle. The kingpin 110 further includes a set of sensors configured to output a signal representing forces applied to the kingpin no by the hitch, as shown in FIGS. 5A, 5B, 5C, and 5D.

In one implementation, the kingpin no includes: a head 117; a shank 116; a base in; a set of fasteners; a geolocation module; a wireless communications module; and a suite of sensors 119 including force sensors (e.g., a strain gauge, an IMU, a load cell), optical sensors (e.g., a one-dimensional depth sensor, a LIDAR sensor, an RGB camera), and/or inertial sensors (e.g., an IMU, an accelerometer, a gyroscope). The kingpin no is further characterized by a unitary steel alloy structure.

In one variation, the kingpin no is coupled to a floor of a trailer 120 and is configured to transfer vertical loads from the trailer 120 into a hitch of a tow vehicle. In this variation, the set of sensors 119 are configured to: output signals representing forces applied to the kingpin no (e.g., via the force sensors); output signals representing inertial conditions of the trailer 120 (e.g., via the inertial sensors); output signals representing a location of the trailer 120 (e.g., via the geolocation module); and transmit these force data, inertial conditions data, weight distribution data, and/or geolocation data to the integrated controller via the communications module.

In another variation, the base in of the kingpin 110 defines a set of through-bores 114 arranged radially about the shank 116 and configured to receive a set of fasteners to couple the kingpin 110 to a floor of the trailer 120 and thus, fasten (e.g., mount, bolt-in) the kingpin 110 to the trailer 120. In this variation, the shank 116 of the kingpin 110 defines a first sensor receptacle extending parallel to a lateral axis of the trailer 120; and defines a second sensor receptacle extending parallel to a longitudinal axis 123 of the trailer 120. Further, a first strain gauge is arranged in the first sensor receptacle and is configured to output a signal representing shear forces in the kingpin 110 parallel to the lateral axis and a second strain gauge is arranged in the second sensor receptacle and configured to output the second signal representing shear forces in the kingpin 110 parallel to the longitudinal axis 123.

In yet another variation, the kingpin no can include a set of force sensors 119. In this variation, the kingpin no can include: a first sensor 119 configured to output signals representing lateral forces (e.g., loads) applied to the kingpin no; and a second sensor 119 configured to output signals corresponding to longitudinal forces (e.g., loads), parallel to a longitudinal axis 123 of the trailer 120, applied to the kingpin no. Each sensor can then transmit these force data to the integrated controller.

The kingpin no can further include an integrated controller configured to interface (e.g., via wireless communication, via wired communication) with the controller 160 in order to: calculate a direction and a magnitude of each force applied to the kingpin no; identify a coupling and/or a decoupling event between a hitch (e.g., a fifth wheel) of a tow vehicle (e.g., a tractor-trailer 120) and the kingpin no based on these forces; calculate a target preload force as a function of a condition of the trailer 120 (e.g., a speed, an incline angle, a tractor-trailer angle, a location, a charge state of a battery assembly 140, a weight distribution) in a tow mode; and, trigger the motor 131 to selectively reduce torque output and/or increase torque output to decrease a difference between each force and the target preload force in the tow mode.

3.1.2 Bogie

Figure 4:
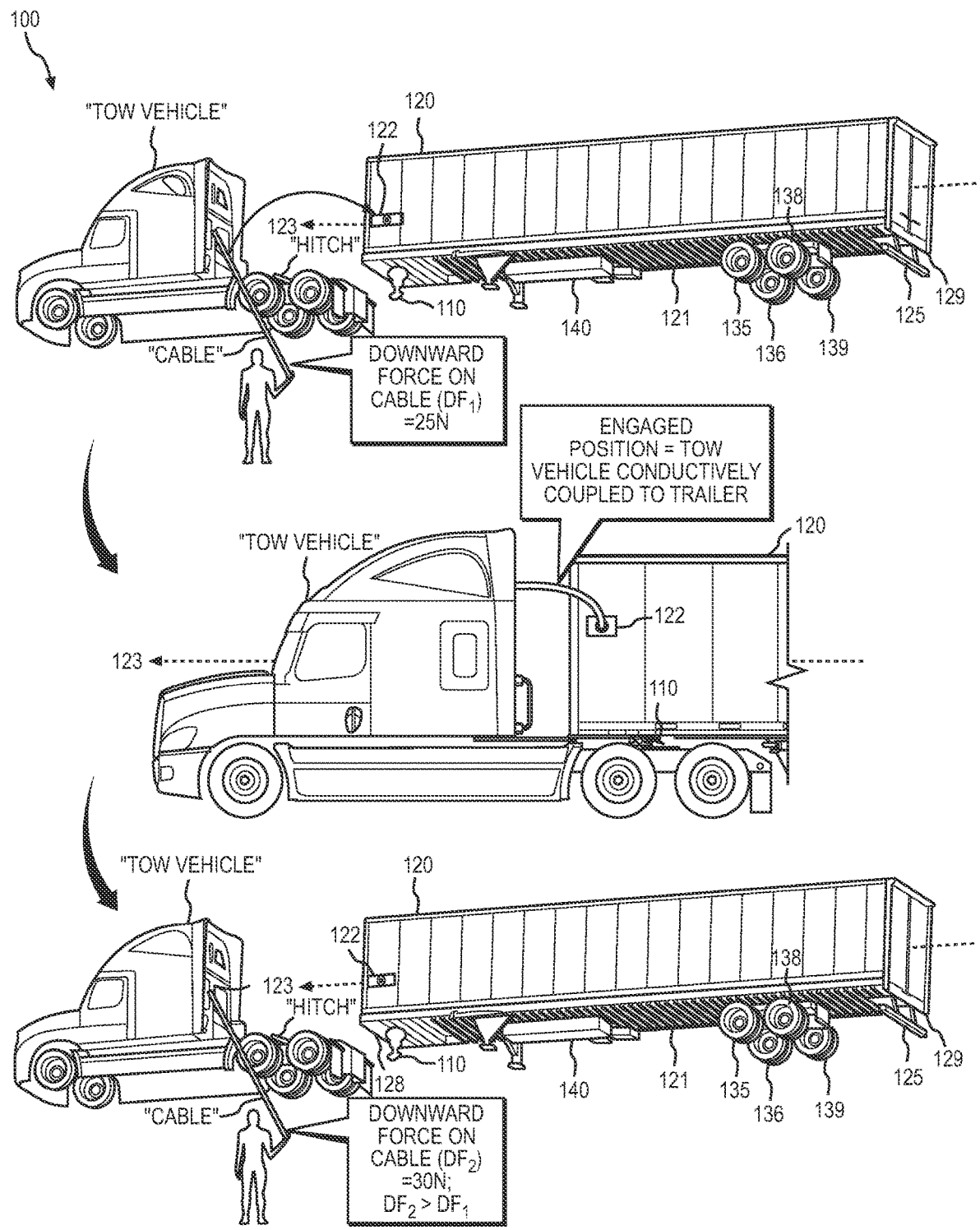
FIG. 4 is a schematic representation of one variation of the system.

In one variation, the system 100 further includes a bogie 130. Further, the bogie includes: a chassis 132; a set of latches 133; a driven axle 137 suspended from the chassis 132; and a motor 131 coupled to the driven axle 137, as shown in FIG. 4.

In one implementation, the bogie 130 includes: a chassis 132 configured to transiently install on a left rail 126 and a right rail 127 of the trailer 120 over a range of longitudinal positions; a set of latches 133 configured to transiently engage a subset of engagement features 124, in the first array of engagement features 124 on the left rail 126 and in the second array of engagement features 124 on the right rail 127, to retain the bogie 130 below the trailer chassis 121 of the trailer 120; a driven axle 137 suspended from the chassis 132; and a motor 131 coupled to the driven axle 137 configured to output torque to the driven axle 137 in a tow mode and regeneratively brake the driven axle 137 in a regenerative braking mode.

In one variation, the left rail 126 and the right rail 127 of the trailer 120 are configured to run along a longitudinal axis 123 of the trailer 120, parallel to the longitudinal centerline, such that, when coupled to the bogie 130, a user (e.g., an operator, a driver, a technician) or a machine may manipulate the bogie 130 between the left rail 126 and the right rail 127 to guide the bogie 130 to a target position below the trailer chassis 121 and/or to remove the bogie 130 from the trailer 120 in a service mode.

3.2 Driven Axle+Motor

In one implementation, the driven axle 137 is supported by an axle housing, suspended from the trailer chassis 121, and includes a left driven wheel 138 and a right driven wheel 139. The axle housing further encapsulates a motor 131 mounted to the driven axle 137 and is configured to protect the driven axle 137 and the motor 131. In this implementation, the motor 131 is configured to drive the left driven wheel 138 and the right driven wheel 139 and thus, output torque in a tow mode. The motor 131 is further configured to regeneratively brake the left driven wheel 138 and the right driven wheel 139 to slow motion of the trailer 120 in a regenerative braking mode.

In one variation, the trailer 120 includes a passive axle 134, suspended from the trailer chassis 121, adjacent the driven axle 137 and includes a left passive wheel 135 and a right passive wheel 136. In this variation, the left passive wheel 135 and the right passive wheel 136 are configured to assist motion of the trailer 120 when the left driven wheel 138 and the right driven wheel 139 are driven by the motor 131 in the tow mode.

3.3 Sensors+Communication Cable

The system 100 can further include a set of sensors 115 including force sensors (e.g., a strain gauge, an inertial measurement unit, a load cell), optical sensors (e.g., a one-dimensional depth sensor, a LIDAR sensor, an RGB camera), inertial sensors (e.g., an inertial measurement unit, an accelerometer, a gyroscope); pressure sensors (e.g., a strain gauge, a pressure gauge); and/or proximity sensors (e.g., an electromagnetic field sensor, a Hall effect sensor, a conductive sensor, an inductive sensor) coupled to the trailer chassis 121, the kingpin 110, or a rear impact guard 125.

In one variation, the trailer chassis 121 and/or the kingpin 110 can include an inertial measurement unit configured to output signals representing motion in pitch, roll, and yaw positions of the kingpin no and/or angular velocity of the trailer 120. The inertial measurement unit can then transmit these signals to the controller 160 to detect a condition of the trailer 120.

In another variation, the kingpin 110 can include: a load cell configured to output signals representing tension, compression, pressure, or torque applied to the kingpin 110 and transmit these signals to the controller 160.

In yet another variation, an array of proximity sensors 115 are coupled to and arranged on the rear impact guard 125 and configured to output signals representing presence and/or absence of an external charging element within a threshold distance of the rear impact guard 125. The array of proximity sensors 115 can then transmit these signals to the controller 160.

In another variation, an array of proximity sensors 115 are coupled to and arranged on the trailer chassis 121 and configured to output signals representing presence and/or absence of a vehicle restraint of a loading dock within a threshold distance of the trailer chassis 121. The array of proximity sensors 115 can then transmit these signals to the controller 160.

In yet another variation, the system 100 can include a set of pressure sensors 115 coupled to a gladhand of a brake line system and configured to output signals corresponding to air pressure of the brake line system of the trailer 120 from an air supply of the tow vehicle and transmit these signals to the controller 160.

Further, the system 100 can include a communication cable arranged on the first end of the trailer chassis. The communication cable is configured to couple to a communication port of the tow vehicle and to transfer non-optical data (e.g., engine speed, engine temperature, oil pressure, charge state of battery pack, wheel speed), associated with a tow vehicle coupled to the trailer 120, to the controller 160. The controller 160 can then manipulate these non-optical data to detect a charge state of the battery pack of the tow vehicle.

4. Charging Panel

Generally, the system 100 includes a charging panel 150 coupled to the trailer chassis 121 and arranged on the second end 129 of the trailer chassis 121 adjacent the battery assembly 140. The charging panel 150 is configured to inductively couple to an external charging element to receive energy from the external charging element, convert this energy into electrical energy, and route electrical energy to the controller 160. The controller 160 can then route electrical energy to the battery assembly 140 in a charge mode and thus, charge the battery assembly 140.

4.1 Inductive Charging

In one implementation, the charging panel 150 includes a rigid panel, a receiver multi-coil inductor 154, and a rectifier. The rigid panel is operable in an open position to form a target gap between the external charging element and the charging panel 150. The receiver multi-coil inductor 154 is arranged on the rigid panel and is configured to inductively couple to the external charging element to receive alternating current from the external charging element. The receiver multi-coil inductor 154 can further define a receiver axis and a first size. The receiver multi-coil inductor 154 can also include a conductive coil supported by the rigid panel and arranged about (e.g., encircling) a magnetic core. The rectifier is electrically coupled to the receiver multi-coil inductor 154 and is configured to convert alternating current into direct current and enable the charging panel 150 to route direct current to the controller 160 in order to route a proportion of the direct current in a first direction to the battery assembly 140 of the trailer 120.

In one variation, the receiver multi-coil inductor 154 includes a set of windings of a conductive material such as copper or aluminum supported by the rigid panel of a non-metallic material and encircles a magnetic core of a ferromagnetic material such as silicon steel. In this variation, the magnetic core is configured to increase and/or guide the electromagnetic field, generated by the external charging element, in order to route electrical energy in a first direction toward the battery assembly 140 of the trailer 120.

In another variation, the receiver multi-coil inductor 154 includes a slit conductive coil (e.g., a pancake coil) of a copper or aluminum wire coil supported by the rigid panel and encircles a magnetic core of a ferromagnetic material, such as iron. In this variation, the receiver multi-coil inductor 154 further includes a sheet of a magnetic material, such as a nanocrystalline alloy, interposed between the rigid panel and the slit conductive coil. The sheet is configured to increase the oscillating magnetic field between the external changing element and the charging panel 150 and reduce energy loss in order to supply electrical energy in a first direction toward the battery assembly 140 of the trailer 120. Thus, the charging panel 150 can increase and guide an oscillating electromagnetic field from the external charging element, convert the oscillating electromagnetic field into electrical energy, and route electrical energy to the controller 160. The controller 160 can then direct electrical energy to the battery assembly 140 of the trailer 120 and thereby, charge the battery assembly 140, and increase the charge efficiency of the battery assembly 140.

However, the charging panel 150 can include a receiver multi-coil inductor 154 of any other conductive coil and any other magnetic core. The conductive coil and the magnetic core can include any other material and can be of any other form. Further, the receiver multi-coil inductor 154 can be supported by the rigid panel in any other way.

Figure 1B:
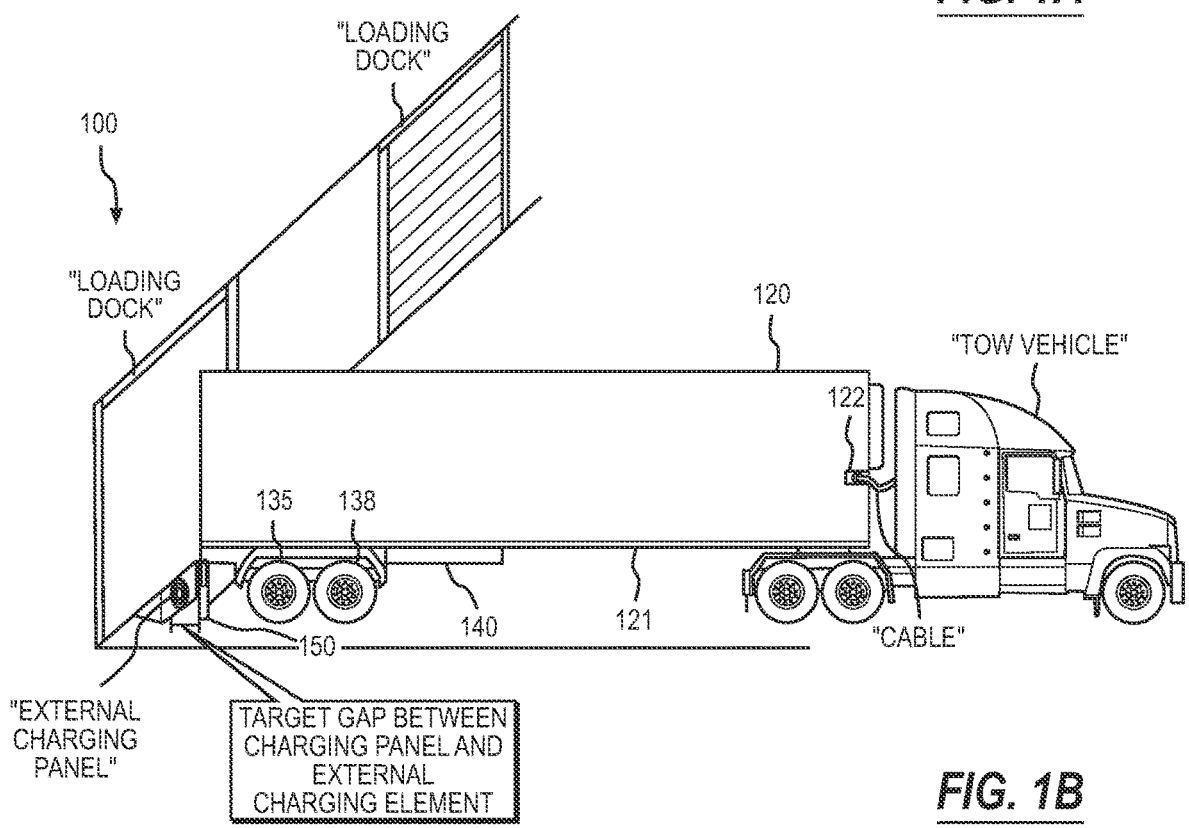

Additionally, the external charging element: is electrically coupled to a power source of a depot or a charging station of a loading dock; includes an emitter multi-coil inductor; and is configured to generate an oscillating electromagnetic field between the emitter multi-coil inductor 152 and the receiver multi-coil inductor 154 of the charging panel 150. The emitter multi-coil inductor 152 can further define a transmission axis and a size approximating the size of the receiver multi-coil inductor 154 of the charging panel 150. The receiver axis of the charging panel 150 is configured to align with the transmission axis of the external charging element to inductively couple the charging panel 150 to the external charging element. The charging panel 150 can then collect energy from the external charging element, convert this energy into electrical energy, and route the electrical energy to the controller 160 for distribution to the battery assembly 140 of the trailer 120, as shown in FIG. 1B.

4.2 Panel Actuator

The system 100 can further include an electromechanical, pneumatic, or hydraulic panel actuator 156 coupled to and arranged on the second end of the trailer chassis 121 and configured to actuate the charging panel 150.

In one implementation, the panel actuator 156 is interposed between the trailer chassis 121 and the charging panel 150 and is configured to advance the charging panel 150 from the trailer chassis 121 to an open position to form a target gap with the external charging element and retract the charging panel 150 to decouple the charging panel 150 from the external charging element.

In one variation, the panel actuator 156 is arranged on the second end of the trailer chassis 121 and is configured to downwardly pivot the charging panel 150 from the trailer chassis 121 to an open position to form a target gap between the external charging element and the charging panel 150 and to upwardly pivot the charging panel 150 to a closed position to decouple the charging panel 150 from the external charging element.

For example, the system 100 can include a pressure sensor 115 coupled to a gladhand of a brake line system and configured to output signals corresponding to air pressure of the brake line system of the trailer 120 from an air supply of the tow vehicle. Based on a first signal received from the pressure sensor 115, the controller 160 can detect absence of motion of the trailer and trigger the panel actuator 156 to advance the charging panel 150 from the trailer chassis 121 to an open position to form a target gap with the external charging element.

5. Battery Assembly

Generally, the system 100 further includes a battery assembly 140 configured to transiently install on the trailer 120 over a range of longitudinal positions and electrically couple to the trailer 120 by a power cable or integrated directly with the trailer chassis 121 in order to receive electrical energy and to supply electrical energy to the motor 131.

More specifically, the battery assembly 140 can further supply electrical energy to the motor 131 to output torque to the driven axle 137 in a tow mode, receive electrical energy, converted by the charging panel 150, to charge the battery assembly 140 in a charge mode, and source electrical energy from the motor 131 to slow motion of the driven axle 137 and charge the battery assembly 140. Further, the battery assembly 140 can include a set of modular batteries configured to engage with each other and fit within a battery frame. The battery frame is configured to fit below a standard trailer chassis 121 of a trailer 120 between the left rail 126 and the right rail 127 and thus, enable a user to quickly and repeatably install the battery assembly 140 or the set of modular batteries below a standard floor of any trailer 120. The set of modular batteries enables a user to selectively adjust the battery capacity of the battery assembly 140 as a function of a predicted distance traveled by the trailer 120, a weight distribution of the trailer 120, and/or a type of the trailer 120 (e.g., a dry van trailer, a refrigerated trailer).

In one implementation, the battery assembly 140 includes a set of latches 133 configured to: transiently engage a subset of engagement features 124, in the first array of engagement features 124 on the left rail 126 and in the second array of engagement features 124 on the right rail 127; and to retain the battery assembly 140 below the trailer chassis 121. In this implementation, each latch in the set of latches 133 can include a solenoid (e.g., an electromechanical solenoid, a pneumatic solenoid), or another electromechanical latch (e.g., an air pressure latch, a mechanical latch) operable in an engaged position and a disengaged position to transiently engage and/or disengage a corresponding engagement feature distributed along the left rail 126 and the right rail 127 of the trailer 120, as described above.

However, each modular battery in the battery assembly 140 can define any other shape and couple to the motor in any other way.

6. Controller

Generally, the controller 160 is coupled to the panel actuator 156 and sensors within the system 100, interfaces with the integrated controller of the kingpin 110 and executes methods and techniques described below to: selectively enter an operational mode (e.g., a charge mode, a tow mode); trigger the panel actuator 156 to extend the charging panel 150 to an open position in the charge mode and to retract the charging panel 150 to a closed position in the tow mode; monitor a charge state of the battery assembly of the trailer 120 and/or of an energy storage system of an electric tow vehicle, a hybrid tow vehicle, and/or a secondary trailer coupled to the trailer 120; selectively route proportions of electrical energy to the battery assembly and each energy storage system to charge the battery assembly and each energy storage system; and selectively operate the motor 131 of the bogie to output torque to the driven axle 137 and to slow motion of the driven axle 137.

Figure 6:
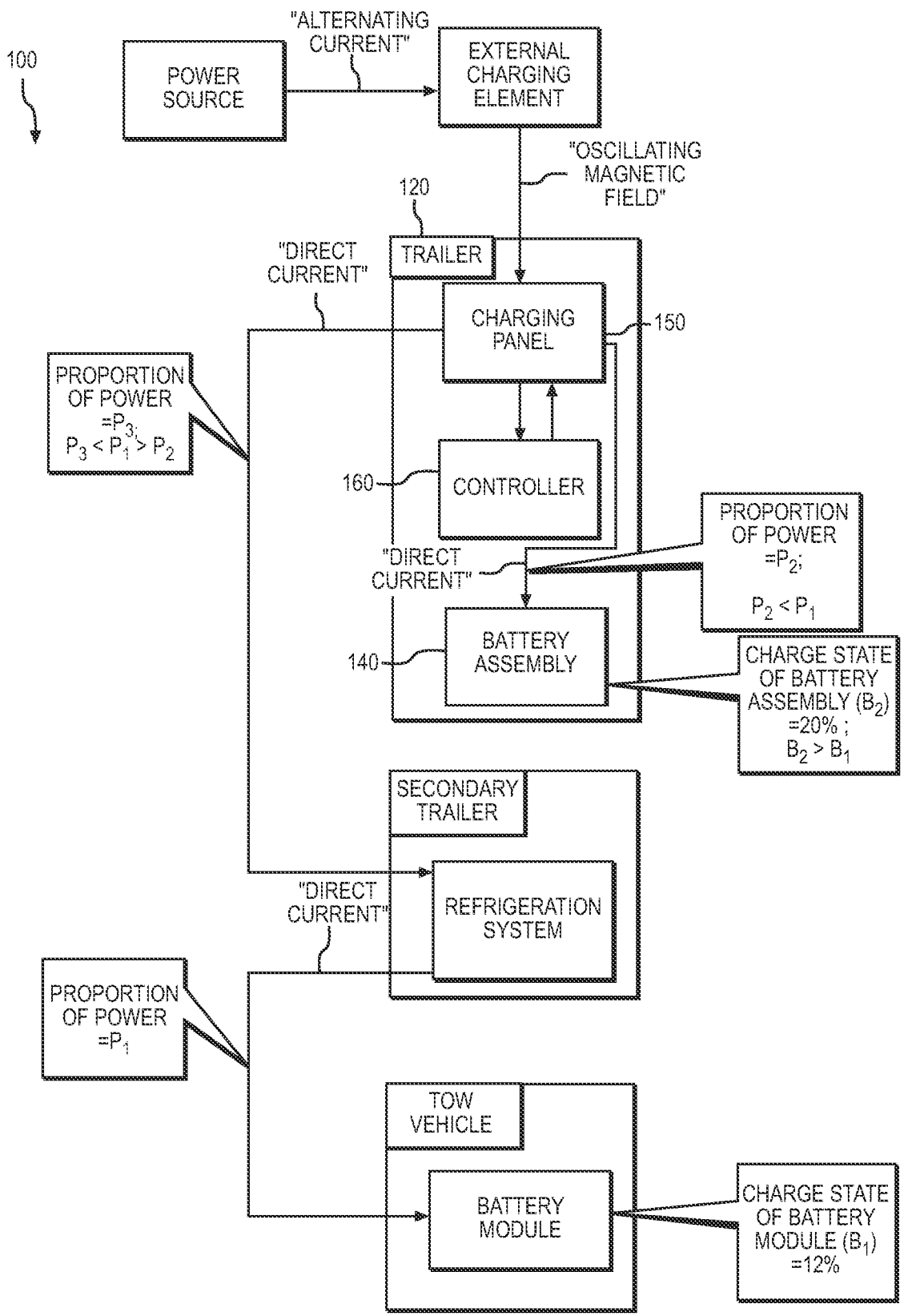
FIG. 6 is a block diagram of one variation of the system.

More specifically, in response to detecting presence of the external charging element within a threshold distance of the trailer 120 via proximity sensors 115, the controller 160 can enter a charge mode and trigger the panel actuator 156 to downwardly pivot the charging panel 150 from the trailer chassis 121 to an open position. Once in the charge mode, the controller 160 can: detect a charge state of the battery assembly 140 of the trailer 120 and/or of an energy storage system of an additional electric tow vehicle or secondary trailer coupled to the trailer 120; and selectively direct proportions of electrical energy, converted by the charging panel 150, to the battery assembly 140 of the trailer 120, to a battery pack of a tow vehicle coupled to the trailer 120, and/or to a battery module or electrical system of the secondary trailer based on these charge states. Then, in response to detecting absence of the external charging element within the threshold distance of the trailer 120, the controller 160 can enter a tow mode and trigger the panel actuator 156 to upwardly pivot the charging panel 150 from the open position to a closed position facing the trailer chassis 121 to decouple the charging panel 150 from the external charging element. In the tow mode, the controller 160 can selectively operate the motor 131 of the bogie 130 to output torque to the driven axle 137 and/or slow motion of the driven axle 137, as shown in FIG. 6.

7. Charging Panel Configurations

Generally, the charging panel 150 is operable in an open position in a charge configuration to: collect energy from the external charging element; convert this energy into electrical energy; and route the electrical energy to the controller 160 for distribution throughout the system 100. The charging panel 150 is further operable in a closed position in a tow configuration to prevent damage to the charging panel 150 and reduce aerodynamic drag during motion of the trailer 120, as shown in FIGS. 2B, 2C, 3A, and 3B.

In one variation, the charging panel 150: is operable in the charge configuration; is pivoted downwardly from the trailer chassis 121, by the panel actuator 156, to an open position at a null-degree surge position and a null-degree sway position to form a target gap between the external charging element; and is inductively coupled to the external charging element in the charge configuration. The charging panel 150: is operable in the tow configuration; decoupled from the external charging element; and is pivoted upwardly from the open position to a closed position, by the panel actuator 156, to face the trailer chassis 121 in the tow configuration.

In another variation, the charging panel 150: is operable in the charge configuration; and is pivoted downwardly from the trailer chassis 121, by the panel actuator 156, to align the transmission axis of the emitter multi-coil inductor 152 of the external charging element and the receiver axis of the charging panel 150 in the open position and to form a target gap between the emitter multi-coil inductor 152 and the receiver multi-coil inductor, in the charge configuration.

In yet another variation, the battery assembly 140 and the charging panel 150 are configured to couple to the trailer chassis 121 over a range of longitudinal positions to balance a weight of the trailer 120. In particular, the battery assembly 140 can be arranged in a first longitudinal position below the trailer chassis 121, and the charging panel 150 can be arranged in a second longitudinal position on the second end 129 of the trailer 120 within a threshold distance of the battery assembly 140 to balance a weight of the trailer 120, containing a first load, on the driven axle 137.

Additionally, the controller 160 can autonomously enter the charge mode and trigger the panel actuator 156 to drive the charging panel 150 to the open position in the charge configuration. The controller 160 can also autonomously transition from the charge mode to a tow mode and trigger the panel actuator 156 to retract the charging panel 150 to the closed position in the tow configuration, as further described below.

7. Charge Mode

Generally, the user (e.g., an operator, a driver, a yard manager) operates the tow vehicle coupled to the trailer 120 in a reverse direction of motion to locate the second end of the trailer chassis 121 proximal a loading dock such that the trailer 120 occupies the loading dock and is prepared for unloading and/or loading of cargo. The controller 160 can interface with the integrated controller of the kingpin 110 to detect forces applied to the kingpin 110 by the hitch of the tow vehicle or detect presence of an external charging element or a vehicle restraint within a threshold distance of the trailer 120 via proximity sensors 115 to enter a charge mode and trigger the panel actuator 156 to advance the charging panel 150 from the trailer chassis 121 to an open position to couple the charging panel 150 to the external charging element.

In one implementation, the controller 160 can interface with the integrated controller of the kingpin 110 to: detect motion of the trailer 120 in a reverse direction such as toward a loading dock; calculate a direction and a magnitude of a force impulse applied to the kingpin no based on a signal received from the set of force sensors; and, in response to detecting the direction of the force impulse corresponding to the reverse direction of motion of the trailer 120, enter a charge mode and trigger the panel actuator 156 to advance the charging panel 150 from the trailer chassis 121 to the open position to couple the charging panel 150 to the external charging element.

7.1 Proximity Sensors+Inductive Charging

In one variation, the controller 160 can: access signals output by an array of proximity sensors 115 coupled to a rear impact guard 125 and detect presence or absence of the external charging element within a threshold distance of the rear impact guard 125. Responsive to detecting presence of the external charging element within the threshold distance of the rear impact guard, the controller 160 can autonomously enter a charge mode and trigger the panel actuator 156 to advance the charging panel 150 to a charge configuration to inductively couple with the external charging element.

In one implementation, the controller 160 can: detect absence of motion of the trailer 120 via an inertial measurement unit coupled to the trailer 120; access a signal from an array of proximity sensors 115 representing presence or absence of the external charging element within a threshold distance of the trailer 120; detect presence of the external charging element within the threshold distance of the rear impact guard 125; and, in response to detecting presence of the external charging element within the threshold distance of the rear impact guard 125, enter a charge mode and trigger the panel actuator 156 to downwardly pivot the charging panel 150 from the trailer chassis 121 to an open position, abutting a proximal face of the rear impact guard 125, to form a target gap between the external charging element and the charging panel 150. In the charge mode, the controller 160 can further calculate a coupling factor between the receiver multi-coil inductor of the charging panel 150 and the transmitter multi-coil inductor of the external charging element and, in response to the coupling factor falling within a target coupling factor range, the controller 160 can direct a maximum alternating current from the emitter multi-coil inductor 152 to the receiver multi-coil inductor.

For example, the charging panel 150 can be arranged on the second end 129 of the trailer chassis 121, aft of the bogie, and coupled to the trailer chassis 121. An operator of a tractor-trailer 120 may then drive the tractor-trailer 120 in a reverse direction of motion to maneuver the tractor-trailer 120 toward a loading dock and align the second end 129 of the trailer chassis 121 with the loading dock at a target position within a depot. Once the driver locates the second end 129 of the trailer chassis 121 at the target position, the controller 160 can: access a first signal from the array of proximity sensors 115; detect presence of the external charging element within the threshold distance of the rear impact guard 125; and, in response to detecting presence of the external charging element within the threshold distance of the rear impact guard 125, enter the charge mode and trigger the panel actuator 156 to downwardly pivot the charging panel 150 from the trailer chassis 121 to an open position, abutting a proximal face of the rear impact guard 125, to form a target gap between the charging panel 150 and the external charging element proximal the dock within the depot. Thus, the rear impact guard 125 can support and prevent damage to the charging panel 150 from external objects while the trailer 120 is docked and the charging panel 150 is inductively coupled to the external charging element in the open position.

In another variation, the controller 160 can: access signals output by an array of proximity sensors 115 coupled to the second end of the trailer chassis 121 and detect presence or absence of a vehicle restraint of a loading dock within a threshold distance of the trailer chassis 121. Responsive to detecting presence of the vehicle restraint within the threshold distance of the trailer chassis via the proximity sensors 115, the controller 160 can implement methods and techniques described above to enter a charge mode and trigger the panel actuator 156 to advance the charging panel 150 to a charge configuration to inductively couple with the external charging element.

Once in the charge mode, the controller 160 can: detect a distance between the receiver multi-coil inductor 154 of the charging panel 150 and the emitter multi-coil inductor 152 of the external charging element; calculate a coupling factor (e.g., a value between 0 and 1) based on a first size of the receiver multi-coil inductor, a second size of the emitter multi-coil inductor 152, and the distance between the receiver multi-coil inductor 154 and the emitter multi-coil inductor 152; and, in response to the coupling factor (e.g., 0.8) falling within a target coupling factor range (e.g., between 0.7 and 1), direct a maximum alternating current from the emitter multi-coil inductor 152 to the receiver multi-coil inductor 154. The controller 160 can then detect a charge state of the battery assembly 140 (e.g., a numerical value, a percentage, a level) via the communication cable and distribute and direct electrical energy from the charging panel 150 to the battery assembly 140 of the tractor-trailer according to the charge state, and thus charge the battery assembly 140 in the charge mode.

7.1 Power Distribution: Internal Combustion Engine Tractor+Trailer

In one variation, in the charge mode, the controller 160 can: detect a charge state of the battery assembly 140 of the trailer 120; and, in response to the charge state of the battery assembly falling below a threshold charge state, selectively direct all electrical energy, converted by the charging panel 150, to the battery assembly 140 and thus, charge the battery assembly 140 of the trailer 120.

For example, the trailer 120 is coupled to a diesel engine tractor. The operator of this tractor trailer may wish to charge the battery assembly 140 of the trailer 120 while the trailer 120 is located at a loading dock and cargo, contained in the trailer chassis 121, is unloaded at the loading dock. The operator may then locate the second end 129 of the trailer chassis 121 at a target position and/or within a threshold distance of a loading dock at a warehouse. The controller 160 can then implement methods and techniques described above to enter a charge mode and trigger the panel actuator 156 to downwardly pivot the charging panel 150 from the trailer chassis 121 to the open position to inductively couple with an external charging element arranged proximal the loading dock. In the charge mode, the controller 160 can: detect a 30% charge state of the battery assembly 140 of the trailer 120; and, in response to the 30% charge state of the battery assembly 140 falling below a threshold charge state of 75%, direct total electrical energy, converted by the charging panel 150, to the battery assembly 140 of the trailer 120, to charge the battery assembly 140. Later, the controller 160 can detect an 85% charge state of the battery assembly 140 of the trailer 120; and, in response to the 85% charge state of the battery assembly 140 exceeding the threshold charge state of 75%, terminate power output from the external charging element to the charging panel 150 and trigger the panel actuator 156 to upwardly pivot the charging panel 150 from the open position to the closed position facing the trailer chassis 121. The operator may then drive the tractor trailer to the next destination.

Therefore, the controller 160 can monitor a charge state of an individual battery assembly 140 of the trailer 120 to direct all electrical energy, converted by the charging panel 150, to the battery assembly 140 and thus, prioritize charging the battery assembly 140 of the trailer 120.

7.2 Charge Order

In one implementation, the controller 160 can access a charge order—defined by a user—that includes a set of charging rules or instructions prior to directing electrical energy to the battery assembly 140 of the trailer 120. Further, a user may wish to define a charge order with an ordered sequence of charging rules or instructions. In particular, a user may wish to charge the battery assembly 140 of the trailer 120 first and then charge a battery module of a hydrogen fuel cell tractor and/or an electric tractor coupled to the trailer 120 or vice versa. The user may also wish to define a maximum proportion of electrical energy for the battery assembly 140 of the trailer 120 and a duration to charge the battery assembly 140.

In one variation, a user may wish to define a threshold charge state and the controller 160 can define a first charge instruction to charge a battery characterized by a charge state less than the threshold charge state and a second charge instruction to charge a battery characterized by a charge state greater than the threshold charge state next. The controller 160 can then compile these charge instructions into a charge order and direct electrical energy to the battery pack of the tow vehicle and the battery assembly of the trailer 120.

For example, the controller 160 can access the charge order including: a first charge instruction indicating a first duration to direct a first proportion of electrical energy to a battery pack of a tow vehicle; and a second charge instruction indicating a second duration for a second proportion of electrical energy, less than the first proportion of electrical energy, to the battery assembly 140 of the trailer 120. The controller 160 can then: detect a hitch of a tow vehicle coupled to the trailer 120 via the kingpin 110; detect a first charge state of a battery pack of the tow vehicle; detect a second charge state of the battery assembly 140 of the trailer 120; based on the first charge instruction, direct the first proportion of electrical energy to the battery pack of the tow vehicle for the first duration; and, based on the second charge instruction, direct the second proportion of electrical energy, less than the first proportion, to the battery assembly 140 of the trailer 120 for the second duration.

Alternatively, the user may wish to define: a first rule to charge a battery within a first charge state range, such as between a 0% charge state and a 30% charge state at a first time; a second rule to charge a second battery within a second charge state range between a 30% charge state and a 60% charge state at a second time succeeding the first time; and a third rule to charge a third battery within a third charge state range between a 60% charge state and a 90% charge state at a third time succeeding the second time. Thus, the user can define a charge order with an ordered sequence of rules and the controller 160 can access and implement the ordered sequence of rules in the charge mode.

For example, the controller 160 can: detect a hydrogen fuel cell tractor with a battery module and a secondary trailer with a secondary battery assembly coupled to the trailer 120; detect a first charge state of the battery module of the hydrogen fuel cell tractor via the communication cable; detect a second charge state of the battery assembly 140 of the electric trailer 120; and detect a third charge state of the secondary battery assembly of the trailer 120. Then, in response to detecting the second charge state of the battery assembly 140 of the trailer 120 falling below the threshold charge state, the third charge state of the secondary battery assembly exceeding the threshold charge state, and the first charge state of the battery module exceeding the second charge state of the battery assembly 140 and falling below the threshold charge state, the controller 160 can: define a charge order to charge the battery assembly 140 of the trailer 120 and then the battery module of the hydrogen fuel cell tractor.

Therefore, the controller 160 can access a charge order defined by the user or define a charge order according to a threshold charge state defined by the user. The controller 160 can then direct electrical energy: to the battery assembly of the trailer 120 to charge the battery assembly 140 of the trailer 120; and/or to an energy storage system of an additional tow vehicle or secondary trailer coupled to the trailer 120 according to the charge order.

7.3 Power Distribution: Electric Tractor+Trailer

In one variation, in the charge mode, the controller 160 can: detect a hitch of a tow vehicle coupled to the trailer 120 via the kingpin no; detect a charge state of the battery assembly 140 of the trailer 120; detect a charge state of an energy storage system—such as a battery pack, a battery module, or a battery assembly—of the tow vehicle; and access a charge order defining a set of charging rules or instructions. The controller 160 can then identify a charging rule or instruction corresponding to each charge state and direct a corresponding proportion of electrical energy, defined in the charge order, to the battery assembly 140 of the trailer 120 and to the energy storage system of the tow vehicle.

In one implementation, the trailer chassis 121 can include a tractor port 122 arranged on the first end 128 of the trailer chassis 121 proximal the kingpin no and configured to receive an electrical cable from the hybrid tractor to electrically couple the electric tractor to the trailer 120. The electrical cable defines a first end coupled to a cable receptacle of the tow vehicle and a second end, opposite the first end, configured to transiently couple to the tractor port 122 of the trailer 120 in the charge mode. The electrical cable is further housed in a spring-loaded spool on the tractor and configured to transiently house a section interposed between the first end and the second end of the electrical cable. The spring-loaded spool is configured to: extend the cable from the tow vehicle toward the tractor port 122 on the trailer 120 to an engaged position responsive to application of a first downward force on the second end of the cable; and retract the cable toward the tow vehicle to a disengaged position responsive to application of a second downward force on the second end of the cable. The controller 160 can then: distribute a proportion of electrical energy from the charging panel 150 of the trailer 120, through the electrical cable, and to the battery module of the electric tractor; and distribute a different proportion of electrical energy to the battery assembly 140 of the trailer 120.

For example, the trailer 120 is coupled to an electric tractor with a battery module. The operator of this tractor-trailer may wish to charge the battery assembly 140 of the trailer 120 and the battery module of the electric tractor while the tractor-trailer is stored in a depot for a period of time such as ten hours. In charge mode, at a first time, the controller 160 can then: detect a hitch of the electric tractor coupled to the trailer 120 via the kingpin 110; detect the second end of the electrical cable conductively coupled to the tractor port 122 of the trailer 120 in the engaged position; detect a first charge state of the battery module of the electric tractor via the communication cable; detect a second charge state of the battery assembly 140 of the trailer 120; and, in response to the second charge state of the battery assembly 140 of the trailer 120 exceeding the first charge state of the battery module of the electric tractor, direct a first proportion of electrical energy to the battery module of the electric tractor via the cable and direct a second proportion of electrical energy, less than the first proportion, to the battery assembly 140 of the trailer 120.

At a second time, the controller 160 can detect a third charge state, greater than the first charge state, of the battery module of the electric tractor via the communication cable; detect a fourth charge state, greater than the second charge state, of the battery assembly 140 of the trailer 120; in response to detecting the third charge state of the battery module of the electric tractor exceeding the fourth charge state of the battery assembly 140 of the trailer 120, direct a third proportion of electrical energy, less than the first proportion, to the battery module of the hybrid tractor; and direct a fourth proportion of electrical energy, greater than the first proportion, to the battery assembly 140 of the trailer 120. Thus, the controller 160 can prioritize charging the battery module of the electric tractor, which may be coupled to the trailer 120 for a short time duration via the cable and manage the charge state of the battery assembly 140 of the trailer 120, which may occupy a loading dock for a longer time duration.

Therefore, the controller 160 can monitor the charge state of a tow vehicle and a trailer 120 to selectively direct proportions of electrical energy to simultaneously charge the battery module of a tow vehicle coupled to the trailer 120 and to charge the battery assembly 140 of the trailer 120 in the charge mode. Additionally, the controller 160 can prioritize charging the battery module of the electric tractor and manage the charge state of the battery assembly of the trailer 120 in preparation for a subsequent trip.

7.4 Power Distribution: Electric Tractor+Trailer+Secondary Trailer

In one variation, the controller 160 can: detect the trailer 120 coupled to the hitch of the tow vehicle via the kingpin no and coupled to a secondary trailer via the trailer coupler; detect a charge state of the battery assembly 140 of the trailer 120; detect a charge state of an energy storage system—such as a battery pack, a battery module, or a battery assembly—of the tow vehicle; and access the charge order defining a set of charging rules or instructions via the communication cable. The controller 160 can then identify a charging rule or instruction corresponding to each charge state and direct a corresponding proportion of electrical energy, defined in the charge order and converted by the charging panel 150: to the battery assembly 140 of the trailer 120; to a secondary battery assembly of the secondary trailer; and/or additional electrical systems coupled to the secondary trailer, such as a refrigeration system according to the charge order and each charge state.

In one example, the trailer 120 is coupled to a secondary dry van trailer with a secondary battery assembly via the vehicle coupler and is communicatively coupled to an electric tractor with a battery pack to form a tandem combination vehicle. In the charge mode, the controller 160: detects the trailer chassis 121 coupled to the secondary trailer; detects a first charge state of a battery pack of the electric tractor via the communication cable; detects a second charge state of the battery assembly 140 of the trailer 120; and detects a third charge state of a secondary battery assembly of the secondary trailer. Then, in response to the second charge state of the battery assembly 140 exceeding the first charge state of the battery pack and, in response to the third charge state of the secondary battery assembly exceeding the second charge state of the battery assembly 140, the controller 160: directs a first proportion of electrical energy, converted by the charging panel 150, to the battery pack of the electric tractor; directs a second proportion of electrical energy, less than the first proportion, to the secondary battery assembly of the secondary trailer; and directs a third proportion of electrical energy, less than the second proportion, to the battery assembly 140 of the trailer 120.

In another example, the trailer 120 is coupled to a electric tractor with a battery pack and a secondary refrigerated trailer with a refrigeration system configured to maintain a target temperature of perishable cargo contained in the secondary refrigerated trailer. In charge mode, the controller 160: detects the trailer chassis 121 coupled to the electric tractor via the vehicle coupler 110 and coupled to the refrigerated trailer via the trailer coupler; detects the first charge state of the battery pack of the electric tractor; and detects the second charge state of the battery assembly 140 of the trailer 120. Then, in response to the second charge state of the battery assembly 140 of the trailer 120 exceeding the first charge state of the battery pack of the electric tractor, the controller 160: directs the first proportion of electrical energy to the battery pack of the electric tractor to charge the battery pack; directs the second proportion of electrical energy, less than the first proportion, to a refrigeration system of the refrigerated trailer; and directs a third proportion of electrical energy, less than the second proportion, to the battery assembly 140 of the trailer 120 to charge the battery assembly 140.

Therefore, the controller 160 can monitor the charge state of a tow vehicle and a set of trailers 120 to selectively direct proportions of electrical energy to simultaneously charge the battery pack of an electric tractor, the battery assembly 140 of the trailer 120, and a secondary battery assembly of a secondary trailer. Additionally, the controller 160 can direct a proportion of electrical energy to a refrigeration system of a secondary refrigerated trailer in the charge mode and thus, prioritize charging the battery pack of the electric tractor and manage the charge state of the battery assembly of the trailer 120 in preparation for a subsequent trip and to supply power to the refrigeration system of the secondary trailer.

8. Variation: Charging Panel on Battery Assembly

In one variation, the charging panel 150 can be coupled to the battery assembly 140 of the trailer 120 and configured to inductively couple to an external charging element arranged below the trailer chassis 121.

In one implementation, the charging panel 150 includes an emitter multi-coil inductor 152 and a rigid panel. The rigid panel is configured to extend from the battery assembly 140 to an open position toward a ground surface below the trailer 120 and inductively couple to an external charging element located below the trailer chassis 121, arranged on and/or embedded within the ground surface.

For example, the charging panel 150 can include a copper pancake coil coupled to the rigid panel. The external charging element is electrically coupled to a power source of a depot and includes a charging pad and an emitter multi-coil inductor 152 arranged within the charging pad. The charging pad is arranged on the ground surface of the depot and defines a width greater than a diameter of the copper pancake coil and less than a width of the driven axle 137 of the trailer 120 such that a user can drive the trailer 120 to a target position over the charging pad to align a receiver axis of the charging panel 150 and the transmission axis of the external charging element. The external charging element can generate an oscillating electromagnetic field between the emitter multi-coil inductor 152 and the receiver multi-coil inductor 154 of the charging panel 150. The controller 160 can then implement methods and techniques described above to direct electrical energy to the battery assembly 140 of the trailer 120.

Alternatively, the charging pad can be arranged on a dolly and an operator can maneuver the dolly to a target position below the trailer chassis 121 to align a receiver axis of the charging panel 150, coupled to the battery assembly 140, and the transmission axis of the external charging element. The external charging element can then generate an oscillating electromagnetic field between the emitter multi-coil inductor 152 and the receiver multi-coil inductor 154 of the charging panel 150. The controller 160 can then implement methods and techniques described above to direct electrical energy to the battery assembly 140 of the trailer 120. Once the battery assembly 140 is charged, the operator may remove the dolly and the charging pad from the target position and the controller 160 can enter a tow mode.

9. Variation: Multiple Charging Panels

In another variation, the system 100 can include a set of charging panels 150 configured to couple to a corresponding external charging element. The controller 160 can then direct proportions of electrical energy to the battery assembly 140 of the trailer 120 to charge the battery assembly 140 in charge mode. Alternatively, the controller 160 can direct a proportion of electrical energy, converted by each charging panel 150, to the battery assembly 140 of the trailer 120 and to an energy storage system of a tow vehicle coupled to the trailer 120.

For example, the system 100 can include a first charging panel 150 coupled to the trailer chassis 121, arranged on the second end 129 of the trailer chassis 121, and configured to couple to the external charging element as described above. The system 100 can further include a second charging panel 150 coupled to the battery assembly 140 and configured to inductively couple to a second external charging element located below the trailer chassis 121 and embedded within a ground surface. The controller 160 can then implement methods and techniques described above to: trigger the second charging panel 150 to advance from the battery assembly 140 to the charging pad in an open position; detect a first charge state of a battery pack of the tow vehicle; detect a second charge state of the battery assembly 140 of the trailer 120; and, in response to the second charge state of the battery assembly 140 of the trailer 120 exceeding the first charge state of the battery pack of the tow vehicle, direct a first proportion of electrical energy, converted by the first charging panel 150, to the battery pack of the tow vehicle and direct a second proportion of electrical energy, less than the first proportion, to the battery assembly 140 of the trailer 120. The controller 160 can then: detect a third charge state of the battery assembly 140 of the trailer 120; and, in response to the third charge state of the battery assembly 140 of the trailer 120 falling below a threshold charge state, direct a third proportion of electrical energy, converted by the second charging panel 150, to the battery assembly 140.

Then, the controller 160 can detect a fourth charge state of the battery assembly 140 of the trailer 120 and, in response to the fourth charge state of the battery assembly 140 of the trailer 120 exceeding the threshold charge state: terminate electrical energy output at each external charging element; trigger the panel actuator 156 to retract the first charging panel 150 upwardly to the closed position to face the trailer chassis 121 and decouple from the external charging element; and trigger the second panel actuator to retract the second charging panel 150 from the charging pad to the battery assembly 140 in a closed position.

Therefore, the controller 160 can direct proportions of electrical energy, converted by multiple charging panels 150, to the battery assembly of the trailer 120 and the battery pack of the tow vehicle in order to simultaneously charge the battery assembly of the trailer 120 and the battery pack of the tow vehicle in preparation for a subsequent trip.

10. Tow Mode

Generally, at the end of charge mode, the controller 160 can interface with the integrated controller of the kingpin no to detect forces applied to the kingpin no by the hitch of the tow vehicle, trigger the panel actuator 156 to upwardly pivot the charging panel 150 to the closed position, and enter a tow mode. In particular, the controller 160 can interface with the integrated controller of the kingpin no to: calculate a direction and a magnitude of a force applied to the kingpin no based on a signal received from the set of force sensors; and, in response to detecting the direction of the force opposite to the direction of an initial coupling force applied to the kingpin 110, trigger the panel actuator 156 to upwardly pivot the charging panel 150 from the open position to a closed position facing the trailer chassis 121 and enter a tow mode.

In one implementation, in tow mode, the controller 160 can detect conditions of the trailer 120 such as a including: a direction of motion of the trailer 120; a tractor-trailer angle (e.g., a steering angle); a speed of the trailer 120; an incline angle of the trailer 120 (e.g., a grade of a ground surface); a location of the trailer 120; forces applied to the kingpin 110 (e.g., lateral forces, longitudinal forces, total forces); and a charge state of the battery assembly 140 of the trailer 120. The controller 160 can then: calculate a target preload force proportional to and/or inversely proportional to the condition of the trailer 120; and trigger the motor 131 to increase torque output and/or reduce torque output in the direction of motion of the trailer 120 to decrease a difference between the target preload force and a total force applied to the kingpin 110 to control the trailer 120 in conjunction with the tow vehicle.

In one variation, the controller 160 can: detect a charge state of the battery assembly 140 of the trailer 120; adjust target torque output proportional to the charge state of the battery assembly 140; and calculate a target preload force inversely proportional to the charge state of the battery assembly 140.

10.1 Dynamic Target Preload Force: Charge State of Battery

In one variation, the controller 160 can detect a "real-time" charge state of the battery assembly 140 coupled to the trailer 120. Further, the controller 160 can then detect a charge state of the battery assembly 140 as a condition of the trailer 120 and selectively adjust a target preload force inversely proportional to the charge state.

For example, during a first time period, the controller 160 can: detect a first longitudinal force applied to the kingpin 110 by the hitch of the tow vehicle; detect a first lateral force applied to the kingpin 110 by the hitch; detect a forward direction of motion and a first speed of the trailer 120; detect a first charge state of 55% of the battery assembly 140; detect a first tractor-trailer angle; calculate a first total force, applied to the kingpin 110 by the hitch, based on the first longitudinal force and the first lateral force; calculate a first target preload force opposite the first direction of motion (e.g., a reverse direction) proportional to the tractor-trailer angle and inversely proportional to the first charge state of 55% of the battery assembly 140; and, in response to the first total force falling below the first target preload force, trigger the motor 131 to reduce torque output in the forward direction of motion to decrease a first difference between the first total force and the first target preload force.

During a second time period, the controller 160 can: detect a second longitudinal force applied to the kingpin 110 by the hitch of the tow vehicle; detect a second lateral force applied to the kingpin 110 by the hitch; detect a forward direction of motion and a second speed of the trailer 120; detect a second tractor-trailer angle less than the first tractor-trailer angle; detect a second charge state of 75% of the battery assembly 140 greater than the first charge state of 55% of the battery assembly 140; calculate a second total force, applied to the kingpin 110 by the hitch, based on the second longitudinal force and the second lateral force; calculate a second target preload force in a reverse direction of motion proportional to the second tractor-trailer angle and inversely proportional to the second charge state of 75% of the battery assembly 140; and, in response to the second total force exceeding the target preload force, trigger the motor 131 to reduce torque output in the forward direction of motion to decrease a second difference between the first total force and the first target preload force.

In another variation, the controller 160 can access a drive route assigned to the trailer 120 and predict a charge state of the battery assembly 140 at the start of the tow mode. In particular, an operator may define a start location and an end location for a drive route and upload this drive route to a user portal. The controller 160 can then: access the drive route; estimate a set of legs between the start location and the end location for the drive route; and populate each leg of the drive route with a time window, a corresponding georeferenced location, and emission conditions associated with the georeferenced location. The computer system can then access this drive route at the start of the tow mode. Then for each leg of the drive route, the controller 160 can autonomously increase or decrease the target preload force at the kingpin 110 proportional to the predicted charge state of the battery assembly 140 associated with each leg of the drive route.

Therefore, the controller 160 can monitor a "real-time" charge state or a predicted charge state of the battery assembly 140 and, accordingly, increase or decrease the target preload force and thereby, increase the life of the battery assembly 140 and reduce emissions by the tow vehicle in the tow mode.

11. Variation: Conductive Charging

In one variation, the charging panel 150 is configured to conductively couple to the external charging element to receive energy from the external charging element, convert this energy into electrical energy, and route electrical energy to the controller 160. The controller 160 can then implement methods and techniques described above to route electrical energy to the battery assembly 140 in a charge mode and thus, charge the battery assembly 140.

In one example, the charging panel 150 is coupled to the trailer chassis 121 and arranged on the second end 129 of the trailer chassis 121. The charging panel 150 further includes a conductive interface configured to couple with a cross-rail external charging element located above the trailer 120 within a loading dock. Responsive to detecting presence of a vehicle restraint of the loading dock within a threshold distance of the trailer chassis 121 via the set of proximity sensors 115, the controller 160 triggers the panel actuator 156 to extend the charging panel 150 from the trailer chassis 121 to an open position in order to conductively couple the charging panel 150 to the cross-rail external charging element located above the trailer 120. The controller 160 then implements methods and techniques described above to route electrical energy to the battery assembly 140 of the trailer 120, the energy storage unit of a tow vehicle coupled to the trailer 120, and/or an electrical system of a secondary trailer in the charge mode. At the end of charge mode, the controller 160 triggers the panel actuator 156 to retract the charging panel 150 from the open position to a closed position proximal the trailer chassis 121 in order to decouple the charging panel 150 from the cross-rail external charging element.

In another example, the trailer 120 defines a cuboid structure and includes a lower face coupled to the trailer chassis 121 and an upper face opposite the lower face. In this example, the charging panel 150 is arranged on the upper face of the cuboid structure and includes a conductive pantograph interface configured to couple with a charging element located above the trailer 120 within a loading dock. Responsive to detecting presence of a vehicle restraint of the loading dock within a threshold distance of the trailer chassis 121 via the set of proximity sensors 115, the controller 160 triggers the panel actuator 156 to extend the charging panel 150 from the trailer chassis 121 to an open position, above the trailer 120, in order to conductively couple the pantograph interface of the charging panel 150 to the external charging element located above the trailer 120. At the end of the charge mode, the controller triggers the panel actuator 156 to retract the charging panel 150 from the open position to a closed position proximal the trailer chassis 121 in order to decouple the charging panel 150 from the external charging element.

However, the charging panel 150 can include any other type of electrical cable or any other type of charging interface and can conductively couple to an external charging element in any other way.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for power distribution of a trailer comprising:
   a trailer chassis comprising:
     a vehicle coupler:
       arranged on a first end of the trailer chassis; and
       configured to couple to a tow vehicle;
     a driven axle suspended from the trailer chassis;
     a motor coupled to the driven axle;
     a battery assembly:
       coupled to the trailer chassis;
       arranged on a second end of the trailer chassis opposite the first end;
       configured to supply electrical energy to the motor to drive the driven axle; and
       configured to source electrical energy from the motor to slow motion of the driven axle;
     a charging panel:
       coupled to the trailer chassis;
       arranged on the second end of the trailer adjacent the battery assembly; and
       configured to inductively couple to an external charging element;
     a panel actuator configured to:
       drive the charging panel downwardly from the trailer chassis to convert energy from the external charging element into electrical energy; and
       retract the charging panel upwardly to decouple the charging panel from the external charging element; and
     a controller configured to:
       at a first time:
         detect the trailer chassis coupled to the tow vehicle via the vehicle coupler;
         detect a first charge state of a battery pack of the tow vehicle;
         detect a second charge state of the battery assembly of the trailer; and
         in response to the second charge state of the battery assembly of the trailer exceeding the first charge state of the battery pack of the tow vehicle:
           direct a first proportion of electrical energy, converted by the charging panel, to the battery pack of the tow vehicle; and
           direct a second proportion of electrical energy, less than the first proportion, to the battery assembly of the trailer.

2. The system of claim 1, wherein the controller is further configured to, at a second time:
   detect a third charge state, greater than the first charge state, of the battery pack of the tow vehicle;
   detect a fourth charge state, greater than the second charge state, of the battery assembly of the trailer; and
   in response to detecting the third charge state of the battery pack of the tow vehicle exceeding the fourth charge state of the battery assembly of the trailer:
     direct a third proportion of electrical energy, less than the first proportion, to the battery pack of the tow vehicle; and
     direct a fourth proportion of electrical energy, greater than the first proportion, to the battery assembly of the trailer.

3. The system of claim 1:
   wherein the panel actuator is arranged on the second end of the trailer chassis; and
   wherein the charging panel:
     is operable in a charge configuration:
       the charging panel is pivoted downwardly from the trailer chassis to an open position to form a target gap between the external charging element and the charging panel to inductively couple to the external charging element in the charge configuration; and
     is operable in a tow configuration:
       the charging panel is decoupled from the external charging element and is pivoted upwardly from the open position to a closed position to face the trailer chassis in the tow configuration.

4. The system of claim 1:
   further comprising, the external charging element:
     comprising a primary multi-coil inductor configured to transfer alternating current to the charging panel by generating an oscillating electromagnetic field between the primary multi-coil inductor and the charging panel;
   wherein the charging panel comprises:
     a rigid panel;
     a secondary multi-coil inductor:
       arranged on the rigid panel; and
       configured to inductively couple to the primary multi-coil inductor to receive alternating current; and
     a rectifier:
       electrically coupled to the secondary multi-coil inductor; and
       configured to convert alternating current into direct current in a first direction; and
   wherein the controller is further configured to:
     direct the first proportion of electrical energy, converted by the charging panel, to the battery pack of the tow vehicle in the first direction; and
     direct the second proportion of electrical energy, less than the first proportion, to the battery assembly of the trailer in the first direction.

5. The system of claim 4:
   wherein the primary multi-coil inductor defines a transmission axis and comprises a conductive material;
   wherein the secondary multi-coil inductor defines a receiver axis and comprises copper; and
   wherein the charging panel is operable in a charge configuration:
     the charging panel pivoted downwardly from the trailer chassis to align the transmission axis and the receiver axis in an open position to form a target gap between the primary multi-coil inductor and the secondary multi-coil inductor, in the charge configuration.

6. The system of claim 4:
wherein the primary multi-coil inductor defines a first size;
wherein the secondary multi-coil inductor defines a second size; and
wherein the controller is further configured to, at an initial time:
  detect a distance between the secondary multi-coil inductor and the primary multi-coil inductor;
  calculate a coupling factor based on the first size, the second size, and the distance between the secondary multi-coil inductor and the primary multi-coil inductor; and
  in response to the coupling factor falling within a target coupling factor range, direct a maximum alternating current from the primary multi-coil inductor to the secondary multi-coil inductor.

7. The system of claim 1:
wherein the trailer chassis further includes a communication cable arranged on the first end of the trailer chassis and configured to couple to a communication port of the tow vehicle;
wherein the vehicle coupler is configured to couple to the secondary trailer comprising a refrigerated trailer; and
wherein the controller is further configured to, at a second time:
  detect the trailer chassis coupled to the secondary trailer via the vehicle coupler;
  detect a third charge state of the battery pack of the tow vehicle via the communication cable;
  detect a fourth charge state of the battery assembly of the trailer;
  detect a fifth charge state of a secondary battery assembly of the secondary trailer; and
  in response to the second charge state of the battery assembly exceeding the first charge state of the battery pack and, in response to the third charge state of the secondary battery assembly exceeding the second charge state of the battery assembly:
    direct a third proportion of electrical energy, converted by the charging panel, to the battery pack of the tow vehicle;
    direct a fourth proportion of electrical energy, less than the first proportion, to the secondary battery assembly of the secondary trailer; and
    direct a fifth proportion of electrical energy, less than the second proportion, to the battery assembly of the trailer.

8. The system of claim 1:
wherein the trailer chassis further includes a communication cable arranged on the first end of the trailer chassis and is configured to couple to a communication port of the tow vehicle;
wherein the vehicle coupler is configured to couple to the secondary trailer comprising a refrigerated trailer; and
wherein the controller is further configured to, at a second time:
  detect the trailer chassis coupled to the refrigerated trailer via the vehicle coupler;
  detect the first charge state of the battery pack of the tow vehicle comprising an electric tractor via the communication cable;
  detect the second charge state of the battery assembly of the trailer; and
  in response to the second charge state of the battery assembly of the trailer exceeding the first charge state of the battery pack of the electric tractor:
    direct the first proportion of electrical energy to the battery pack of the electric tractor to charge the battery pack;
    direct the second proportion of electrical energy, less than the first proportion, to a refrigeration system of the refrigerated trailer; and
    direct a third proportion of electrical energy, less than the second proportion, to the battery assembly of the trailer to charge the battery assembly.

9. The system of claim 1:
wherein the trailer chassis further comprises:
  a rear impact guard:
    coupled to the trailer chassis;
    arranged on the second end of the trailer chassis and extending below the trailer chassis toward a ground surface; and
    configured to support the charging panel and prevent damage to the charging panel from external objects; and
  an array of proximity sensors:
    coupled to and arranged on the rear impact guard; and
    configured to output signals representing presence of the external charging element within a threshold distance of the rear impact guard; and
wherein the controller is further configured to, at an initial time:
  detect absence of motion of the trailer;
  access a first signal from the array of proximity sensors;
  detect presence of the external charging element within the threshold distance of the rear impact guard; and
  in response to detecting presence of the external charging element within the threshold distance of the rear impact guard:
    enter a charge mode; and
    trigger the panel actuator to advance the charging panel from the trailer chassis to an open position, abutting a proximal face of the rear impact guard, to form a target gap between the external charging element and the charging panel.

10. The system of claim 9:
wherein the controller is further configured to, at a second time:
  detect a third charge state of the battery assembly of the trailer;
  detect a fourth charge state of the battery pack of the tow vehicle; and
  in response to the third charge state of the battery assembly and the fourth charge state of the battery pack of the tow vehicle exceeding a threshold charge state:
    trigger the panel actuator to retract the charging panel from the open position to a closed position facing the trailer chassis to decouple the charging panel from the external charging element; and
    enter a tow mode.

11. The system of claim 1:
further comprising the trailer:
  comprising a left rail:
    coupled to the trailer chassis;
    extending parallel to and laterally offset from a longitudinal centerline of the trailer; and defining a first array of engagement features distributed along the left rail and longitudinally offset by a pitch distance; and
comprising a right rail:
    coupled to the trailer chassis;
    extending parallel to and laterally offset from the longitudinal centerline of the trailer opposite the left rail; and
    defining a second array of engagement features distributed along the right rail and longitudinally offset by the pitch distance;
further comprising a bogie:
    comprising a chassis configured to transiently install on the left rail and the right rail of the trailer over a range of longitudinal positions; and
    comprising a first set of latches configured to transiently engage a first subset of engagement features, in the first array of engagement features on the left rail and in the second array of engagement features on the right rail, to retain the bogie below the trailer chassis;
wherein the driven axle is suspended from the chassis; and
wherein the battery assembly further comprises a second set of latches configured to transiently engage a second subset of engagement features, in the first array of engagement features on the left rail and in the second array of engagement features on the right rail, to retain the battery assembly below the trailer chassis.

12. The system of claim 1:
wherein the trailer chassis further comprises a tractor port arranged on the first end of the trailer chassis;
further comprising, a cable:
    defining a third end coupled to a cable receptable of the tow vehicle; and
    defining a fourth end configured to transiently couple to the tractor port; and
further comprising, a spring-loaded spool:
    coupled to the tow vehicle;
    configured to transiently house a section interposed between the third end and the fourth end of the cable;
    configured to extend the cable from the tow vehicle toward the tractor port on the trailer to an engaged position responsive to application of a first downward force on the fourth end of the cable; and
    configured to retract the cable toward the tow vehicle to a disengaged position responsive to application of a second downward force on the fourth end of the cable.

13. The system of claim 12, wherein the controller is further configured to, at the first time:
    detect the fourth end of the cable conductively coupled to the tractor port of the trailer in the engaged position; and
    direct the first proportion of electrical energy, converted by the charging panel, to the battery pack of the tow vehicle via the cable, in response to the second charge state of the battery assembly of the trailer exceeding the first charge state of the battery pack of the tow vehicle.

14. The system of claim 1:
further comprising:
    a second charging panel arranged on the battery assembly and configured to inductively couple to a second external charging element located below the trailer chassis;
    a battery assembly actuator configured to extend the second charging panel from the battery assembly to the second external charging element in an engaged position and retract the second charging panel toward the trailer chassis in a disengaged position; and
    a proximity sensor:
        coupled to and arranged on the battery assembly; and
        configured to output a signal representing presence of the second external charging element below the trailer chassis and within a threshold distance of the battery assembly; and
wherein the controller is further configured to, at the first time:
    detect presence of the second external charging element below the trailer chassis and within the threshold distance of the battery assembly based on the signal received from the proximity sensor;
    trigger the panel actuator to extend the second charging panel to the engaged position to form a target gap between the second charging panel and the second external charging element, in response to detecting presence of the second external charging element below the trailer chassis and within the threshold distance of the battery assembly;
    detect a third charge state of the battery assembly of the trailer; and
    in response to the third charge state of the battery assembly of the trailer falling below a threshold charge state, direct a third proportion of electrical energy from the second charging panel to the battery assembly of the trailer to charge the battery assembly.

15. The system of claim 1:
wherein the vehicle coupler further comprises a kingpin:
    configured to couple to a hitch of the tow vehicle; and
    comprising a set of force sensors configured to output signals representing forces applied to the kingpin; and
wherein the controller is further configured to, at an initial time:
    detect motion of the trailer in a reverse direction;
    calculate a first direction and a first magnitude of a first force impulse applied to the kingpin based on a first signal received from the set of force sensors; and
    in response to detecting the first direction of the first force applied to the kingpin corresponding to the reverse direction of motion of the trailer:
        trigger the panel actuator to advance the charging panel from the trailer chassis to an open position to couple to the external charging element; and
        enter a charge mode.

16. The system of claim 15:
wherein the kingpin comprises:
    a head;
    a base coupled to the first end of the trailer opposite the charging panel; and
    a shank:
        interposed between the head and the base; and
        configured to transiently couple to a hitch of the tow vehicle; and
wherein the controller is further configured to, at a third time:
    calculate a second direction and a second magnitude of a second force applied to the kingpin based on a second signal received from the set of force sensors; and in response to detecting the second direction of the second force opposite to the first direction of the first force applied to the kingpin:
   terminate the charge mode;
   trigger the panel actuator to retract the charging panel from the open position to a closed position facing the trailer chassis; and
   enter a tow mode.

17. A system for power distribution of a trailer comprising:
   a trailer chassis comprising:
      a vehicle coupler:
         arranged on a first end of the trailer chassis; and
         configured to couple to a tow vehicle;
   a driven axle suspended from the trailer chassis;
   a motor coupled to the driven axle;
   a battery assembly:
      comprising a set of latches configured to transiently engage a subset of engagement features, in the first array of engagement features and in the second array of engagement features, to retain the battery assembly below the trailer chassis;
      configured to supply electrical energy to the motor to drive the driven axle; and
      configured to source electrical energy from the motor to slow motion of the driven axle;
   a charging panel:
      coupled to the trailer chassis;
      arranged on a first end of the trailer chassis opposite the first end;
      operable in a charge configuration:
         the charging panel facing and coupled to an external charging element to store energy from the external charging element and convert energy into electrical energy in the charge configuration; and
      operable in a tow configuration:
         the charging panel decoupled from the external charging element in the tow configuration;
   a panel actuator configured to actuate the charging panel; and
   a controller configured to:
      trigger the panel actuator to maneuver the charging panel between the charge configuration and the tow configuration; and
      distribute electrical energy to a battery pack of the tow vehicle and the battery assembly of the trailer according to a charge order.

18. The system of claim 17, wherein the controller is further configured to:
   access the charge order comprising:
      a first charge instruction indicating a first duration to direct a first proportion of electrical energy, converted by the charging panel, to a battery pack of a tow vehicle to charge the battery pack; and
      a second charge instruction indicating a second duration to direct a second proportion of electrical energy, less than the first proportion of electrical energy, to the battery assembly of the trailer to charge the battery assembly;
   detect a first charge state of a battery pack of the tow vehicle;
   detect a second charge state of the battery assembly of the trailer;
   based on the first charge instruction, direct the first proportion of electrical energy to the battery pack of the tow vehicle for the first duration; and
   based on the second charge instruction, direct the second proportion of electrical energy to the battery assembly of the trailer for the second duration.

19. The system of claim 17, wherein in a first configuration:
   the battery assembly is arranged in a first longitudinal position below the trailer chassis; and
   the charging panel is arranged in a second longitudinal position on the second end of the trailer within a threshold distance of the battery assembly to balance a weight of the trailer, containing a first load, on the driven axle.

20. A system for power distribution of a trailer comprising:
   a trailer chassis comprising:
      a vehicle coupler:
         arranged on a first end of the trailer chassis; and
         configured to couple to a tow vehicle;
   a driven axle suspended from the trailer chassis;
   a motor coupled to the driven axle;
   a battery assembly:
      coupled to the trailer chassis;
      arranged on a second end of the trailer chassis opposite the first end;
      configured to supply electrical energy to the motor to drive the driven axle; and
      configured to source electrical energy from the motor to slow motion of the driven axle;
   a charging panel:
      coupled to the trailer chassis;
      arranged on a second end of the trailer chassis opposite the first end; and
      configured to couple to an external charging element; and
   a panel actuator configured to advance the charging panel from the trailer chassis to an open position to form a target gap between the external charging element and the charging panel and to retract the charging panel to a closed position to decouple the charging panel from the external charging element.

* * * * *